US011518023B2

(12) United States Patent
Nagashima

(10) Patent No.: US 11,518,023 B2
(45) Date of Patent: Dec. 6, 2022

(54) CONTROL DEVICE, ROBOT, AND ROBOT SYSTEM

(71) Applicant: Seiko Epson Corporation, Tokyo (JP)

(72) Inventor: Yoshiki Nagashima, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 271 days.

(21) Appl. No.: 16/369,037

(22) Filed: Mar. 29, 2019

(65) Prior Publication Data

US 2019/0299400 A1 Oct. 3, 2019

(30) Foreign Application Priority Data

Mar. 30, 2018 (JP) .............................. JP2018-066410

(51) Int. Cl.
*B25J 9/16* (2006.01)

(52) U.S. Cl.
CPC ............ *B25J 9/161* (2013.01); *B25J 9/1664* (2013.01)

(58) Field of Classification Search
CPC ........ B25J 9/161; B25J 9/1658; B25J 9/1664; B25J 9/1671; B25J 13/00; G05B 2219/40392; G05B 19/4068
See application file for complete search history.

(56) References Cited

U.S. PATENT DOCUMENTS

| | | | |
|---|---|---|---|
| 6,167,328 A * | 12/2000 | Takaoka | B25J 9/1671 318/568.1 |
| 9,278,449 B1 * | 3/2016 | Linnell | B25J 9/1674 |
| 10,684,830 B2 * | 6/2020 | Mimlitch, III | G06F 11/3664 |
| 2002/0038168 A1 * | 3/2002 | Kasuga | G06F 8/34 700/250 |
| 2003/0023347 A1 * | 1/2003 | Konno | B25J 9/1671 700/245 |
| 2006/0152533 A1 * | 7/2006 | Read | B25J 9/1671 345/653 |
| 2007/0150102 A1 * | 6/2007 | Park | G06F 8/34 700/245 |
| 2008/0009973 A1 * | 1/2008 | Matsuo | B25J 9/1671 700/246 |
| 2011/0071676 A1 * | 3/2011 | Sanders | B25J 9/1661 700/250 |
| 2013/0255426 A1 * | 10/2013 | Kassow | B25J 18/00 74/490.03 |

(Continued)

FOREIGN PATENT DOCUMENTS

JP H08-249026 A 9/1996

*Primary Examiner* — Ryan Rink
(74) *Attorney, Agent, or Firm* — Gang Yu

(57) ABSTRACT

A control device includes: a processor that is configured to execute computer-executable instructions so as to control a robot, wherein the processor is configured to: display a first edit screen on which an operation sequence of the robot can be edited by selecting images representing one or more operations among images representing a plurality of operations and arranging the images on a screen, and a second edit screen on which the operation sequence expressed in a programming language, which is obtained by converting the operation sequence edited via the first edit screen is displayed and the operation sequence expressed in the programming language can be edited, on a display; and control the robot based on the operation sequence edited via at least one of the first edit screen and the second edit screen.

20 Claims, 22 Drawing Sheets

(56) References Cited

U.S. PATENT DOCUMENTS

| | | | |
|---|---|---|---|
| 2014/0277743 A1* | 9/2014 | Hart | B25J 9/1661 |
| | | | 700/264 |
| 2016/0184997 A1* | 6/2016 | Uchiyama | B25J 9/1697 |
| | | | 700/259 |
| 2016/0284232 A1* | 9/2016 | Sisamos | G05B 19/0426 |
| 2019/0051049 A1* | 2/2019 | Shimakawa | G06F 9/45508 |
| 2019/0299401 A1* | 10/2019 | Sugiyama | B25J 9/161 |

* cited by examiner

*FIG. 13*

```
'Application
Function Main
    Xqt Func_2
Fend

'Job
Function Func_2
    Call Func_3
    Call Func_4
    Call Func_5
    Call Func_6
    Call Func_10
    Call Func_11
Fend 'BasicSettings
Function Func_3
    Motor On           ⎫
    Power High         ⎬ CLM011
    Speed 50           ⎪
    Accel 50, 50       ⎭
Fend 'Motion
Function Func_4
    Speed 10                                               ⎫
    Accel 10, 10                                           ⎬ CLM051
    Go XY(87.7443, 432.535, 426.704, 174.255, 0.167451, -177.68)
Fend 'Motion
Function Func_5
    Speed 10                                                ⎫
    Accel 10, 10                                            ⎬ CLM052
    Go XY(-387.67, 210.945, 426.704, -112.83., 0.167492, -177.68)
Fend 'Container
Function Func_6
    Call Func_8     ⎫ CLM031
    Call Func_9     ⎭
Fend
```

CLM, De21

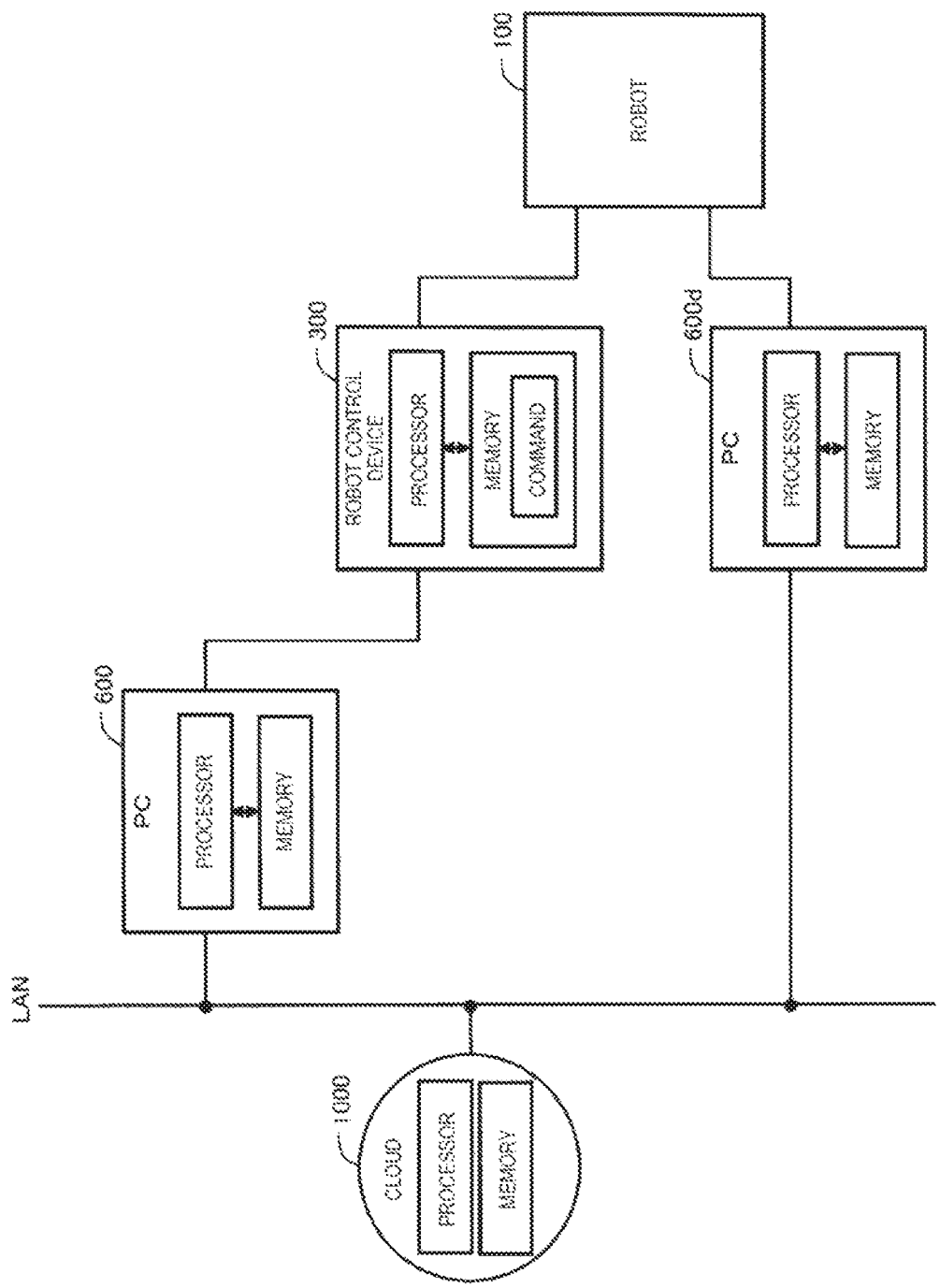

CONTROL DEVICE, ROBOT, AND ROBOT SYSTEM

BACKGROUND

1. Technical Field

The present invention relates to a technology for programming a robot.

2. Related Art

In the related art, there is a user interface for programming a robot. For example, in US Patent Publication 2013/0255426A1, a user interface that can be programmed by a user who does not have a special skill is provided.

However, in US Patent Publication 2013/0255426A1, even a user who has an advanced programming skill has to perform programming using the same user interface as the user who does not have an advanced programming skill. Therefore, it was difficult for a user who has an advanced programming skill to designate processing contents of the robot in detail, and to perform programming.

SUMMARY

An advantage of some aspects of the invention is to solve at least a part of the problems described above, and the invention can be implemented as the following aspects or application examples.

A control device for controlling a robot is provided. The control device includes: a display control unit that is capable of displaying a first edit screen on which an operation sequence of the robot can be edited by selecting images representing one or more operations among images representing a plurality of operations and arranging the images on a screen, and a second edit screen on which the operation sequence expressed in a programming language, which is obtained by converting the operation sequence edited via the first edit screen is displayed and the operation sequence expressed in the programming language can be edited, on a display; and an operation control unit that controls the robot based on the operation sequence edited via at least one of the first edit screen and the second edit screen.

BRIEF DESCRIPTION OF THE DRAWINGS

The invention will be described with reference to the accompanying drawings, wherein like numbers reference like elements.

FIG. 13 illustrates a second edit screen.

FIG. 22 is a conceptual diagram illustrating an example in which the control device of the robot is configured with a plurality of processors.

DESCRIPTION OF EXEMPLARY EMBODIMENTS

A. First Embodiment

Figure 1:
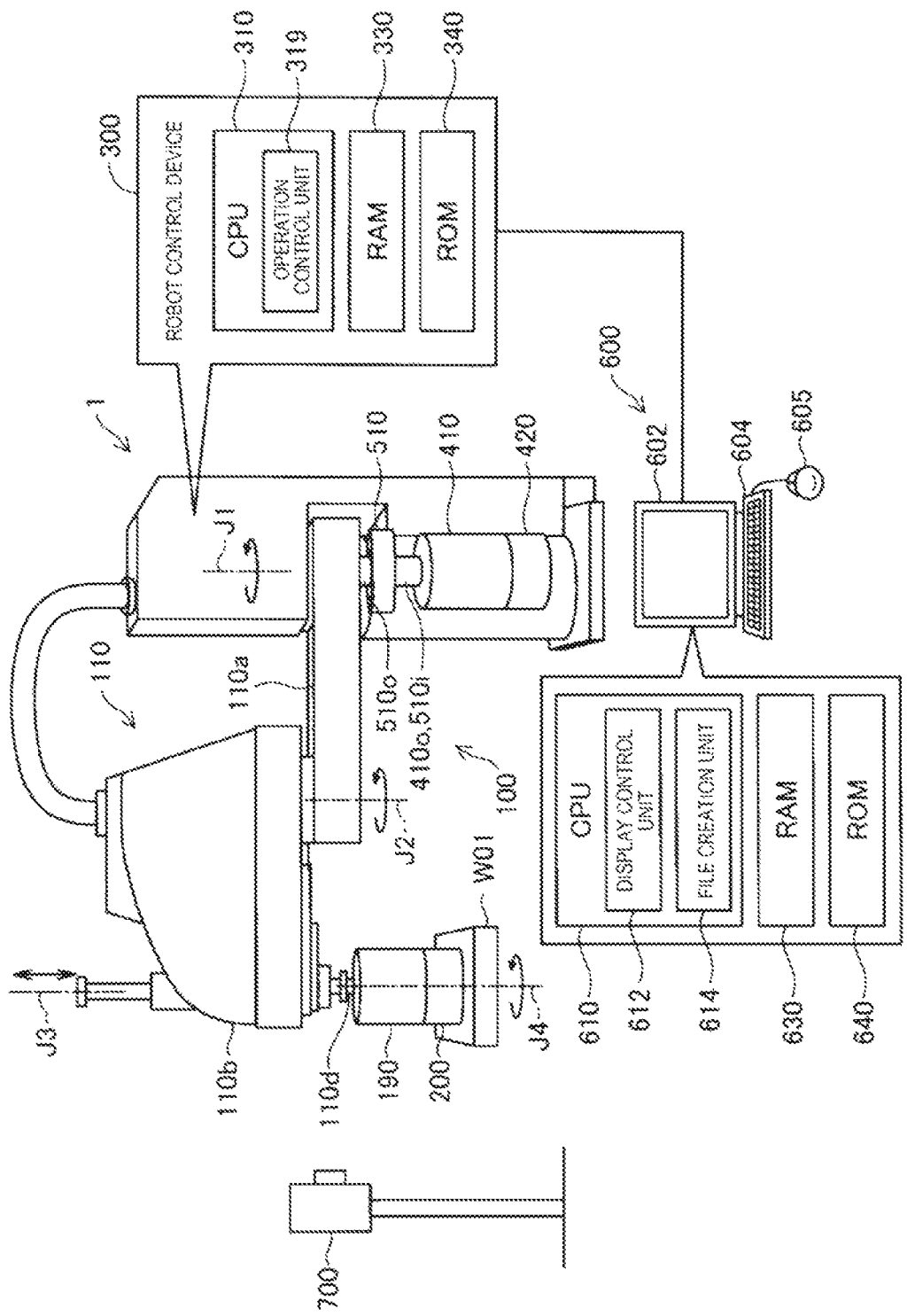
FIG. 1 is an explanatory diagram schematically illustrating a robot system of the embodiment.

A1. Configuration of Robot System:

FIG. 1 is an explanatory diagram schematically illustrating a robot system 1 of the embodiment. The robot system 1 of the embodiment includes a robot 100, an end effector 200, a camera 700, and a setting device 600.

The robot 100 is a 4-shaft robot including a robot control device 300 and an arm 110 having four joints J1 to J4. The joints J1, J2 and J4 are twisted joints. The joint J3 is a linear motion joint. Configuration elements between the joints and joints that configure the arm 110 are referred to as "arm elements" in the specification. In FIG. 1, among the plurality of arm elements included in the arm 110, an arm element 110a between the joint J1 and the joint J2, an arm element 110b between the joint J2 and the joint J3, and an arm element 110d that configures a distal end of the arm 110 are illustrated with symbols.

The robot 100 makes each of the four joints J1 to J4 rotate or go straight with a servo motor, and accordingly, it is possible to dispose the end effector 200 attached to the distal end portion of the arm 110 in a posture of being designated in a position designated in a three-dimensional space. In addition, a point representing the position of the end effector 200 in the three-dimensional space is also referred to as "control point" or tool center point (TCP).

The robot 100 includes a servo motor 410, a decelerator 510, and a motor angle sensor 420 at each joint. In FIG. 1, in order to make it easy to understand the technology, the servo motor 410, the decelerator 510, and the motor angle sensor 420 are schematically illustrated only for the joint J1.

The servo motor 410 is supplied with an electric current from the robot control device 300 and generates a driving force. More specifically, the servo motor 410 is supplied with an electric current from the robot control device 300 and rotates an output shaft 410o thereof.

The motor angle sensor 420 detects an angular position Pm of the output shaft 410o of the servo motor 410. The motor angle sensor 420 is a rotary encoder. The angular position Pm of the output shaft 410o detected by the motor angle sensor 420 is transmitted to the robot control device 300.

The decelerator 510 has an input shaft 510i and an output shaft 510o. The decelerator 510 converts a rotation input to the input shaft 510i into a rotation output of which a rotational speed is lower than that of the rotation input, and outputs the rotation output from the output shaft 510o. The decelerator 510 is specifically a wave gear decelerator. The input shaft 510i of the decelerator 510 is connected to the output shaft 410o of the servo motor 410. An angular position of the input shaft 510i is equivalent to the angular position Pm of the output shaft 410o of the servo motor 410.

The arm element 110a is fixed to the output shaft 510o of the decelerator 510 of the joint J1. As a result, the arm element 110a is rotated in the joint J1 via the decelerator 510 by rotation of the output shaft 410o of the servo motor 410.

The robot 100 includes a force sensor 190 at the distal end of the arm 110. The end effector 200 is attached to the arm 110 of the robot 100 via the force sensor 190. The force sensor 190 can detect the magnitude of the applied external force. More specifically, the force sensor 190 can measure the forces in three axial directions of an X axis, a Y axis, and a Z axis and the torque around the X axis, the Y axis, and the Z axis, which are added from outside, that is, from a configuration other than the force sensor 190. Therefore, the force sensor 190 can measure the forces in the three axial directions of the X axis, the Y axis, and the Z axis and the torque around the X axis, the Y axis, and the Z axis, which act on the end effector 200. The output of the force sensor 190 is transmitted to the robot control device 300 and used for controlling the robot 100.

The robot control device 300 is a control device that controls the arm 110 and the end effector 200. The robot control device 300 is accommodated in a housing of the robot 100. The robot control device 300 includes a computer including a central processing unit (CPU) 310 that serves as a processor, a random access memory (RAM) 330, and a read only memory (ROM) 340. The CPU 310 realizes various functions which will be described later by loading a computer program stored in the ROM 340 into the RAM 330 and executing the computer program. FIG. 1 illustrates a functional unit of the CPU 310 of the robot control device 300 that controls the robot 100 as an "operation control unit 319".

The end effector 200 is attached to the distal end of the arm 110. The end effector 200 can grasp a workpiece W01 under the control of the robot control device 300 and can release the grasped workpiece W01. As a result, for example, the arm 110 and the end effector 200 of the robot 100 can be moved while grasping the workpiece W01 which is a work target object under the control of the robot control device 300. In addition, in FIG. 1, in order to make it easy to understand the technology, the end effector 200 is illustrated as a simple column.

The camera 700 can capture a photographic image including the workpiece W01, the periphery of the workpiece W01, and the arm 110. The image generated by the camera 700 is transmitted to the robot control device 300 and used for controlling the robot 100.

The setting device 600 generates an operation sequence that defines an operation of the robot 100. The setting device 600 is a computer including a display 602 that functions as an output device, and a keyboard 604 and a mouse 605 that function as input devices. The setting device 600 further includes a CPU 610 as a processor, a RAM 630, and a ROM 640. The CPU 610 realizes various functions which will be described later by loading a computer program stored in the ROM 640 into the RAM 630 and executing the computer program.

The setting device 600 is connected to the robot control device 300. The operation sequence generated by the setting device 600 is transmitted to the robot control device 300. The robot control device 300 operates the robot 100 according to the operation sequence received from the setting device 600.

In addition, the setting device 600 may be connected to the robot control device 300 via a teaching pendant. The teaching pendant can generate the operation sequence that defines the operation of the robot 100 alone, that is, without cooperating with the setting device 600.

Figure 2:
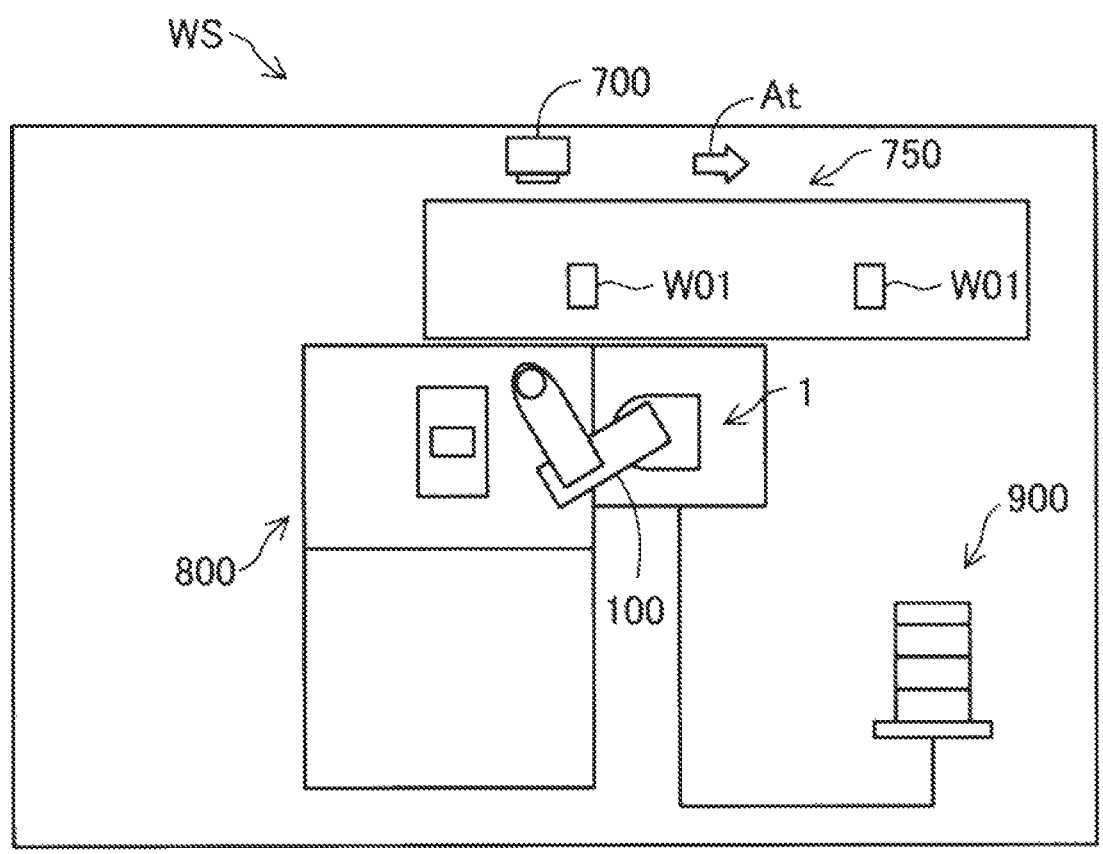
FIG. 2 is an explanatory diagram illustrating a relationship of the robot system, a processing device, a transport device, and a warning lamp.

A2. Relationship Between Robot System and Peripheral Devices:

FIG. 2 is an explanatory diagram illustrating a relationship of the robot system 1, a processing device 800, a transport device 750, and a warning lamp 900. The robot system 1, the processing device 800, the transport device 750, and the warning lamp 900 are collectively referred to as "workstation WS". In one workstation WS, one work is performed. In addition, in order to make it easy to understand the technology, illustration of the setting device 600 (refer to FIG. 1) included in the robot system 1 will be omitted.

The processing device 800 is a device that performs predetermined processing with respect to the workpiece W01. The processing device 800 operates together with the robot 100. More specifically, the processing device 800 is supplied with the workpiece W01 from the robot 100 and performs predetermined processing with respect to the received workpiece W01. In addition, the processed workpiece W01 is carried from the processing device 800 to the transport device 750 by the robot 100.

The transport device 750 is a belt conveyor including a roller and a belt. The transport device 750 moves the belt in a direction indicated by an arrow At in FIG. 1 by driving the roller. The transport device 750 loads the workpiece W01 on the belt and transports the workpiece W01 in the direction indicated by the arrow At.

The warning lamp 900 receives a signal from the robot 100 and the processing device 800 and is turned on. The processing device 800 and the warning lamp 900 are connected to the robot control device 300 (refer to FIG. 1) of the robot 100, and are controlled by the robot control device 300. In addition, in the embodiment, the transport device 750 is controlled by a control device other than the robot control device 300.

Figure 3:
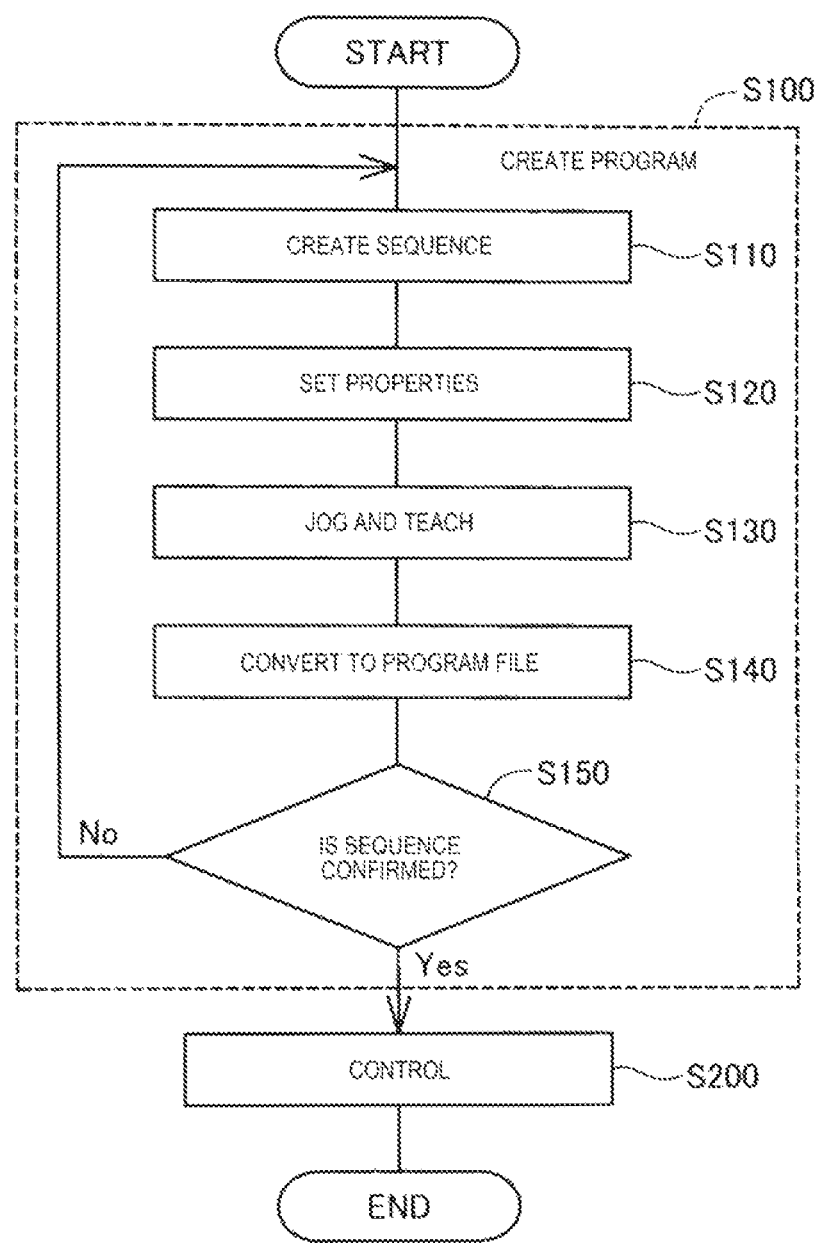
FIG. 3 is a flowchart illustrating a flow of processing in a workstation.

A3. Creation of Operation Sequence:

FIG. 3 is a flowchart illustrating a flow of processing in the workstation WS. When operating the workstation WS including the robot system 1, first, in step S100, a program for operating the workstation WS including the robot system 1 is created. Step S100 includes steps S110 to S130. The creation of the program is performed by a user via the setting device 600 (refer to FIG. 1).

In step S110, the operation sequence of the robot 100, the processing device 800, and the warning lamp 900 is created. More specifically, the user edits images or characters via at least one of a first edit screen De1 and a second edit screen De2 to be displayed on the display 602 of the setting device 600, and creates the operation sequence of each configuration element. The first edit screen De1 and the second edit screen De2 will be described later.

In addition, in a stage where the processing of step S110 is first performed, values of parameters for quantitatively defining the position of the control point in each operation included in the sequence has not yet been determined. The parameters of operation other than parameters for quantitatively defining the position can be defined in step S110. Specific parameters for quantitatively defining each operation are collectively referred to as "properties", not being limited to the parameter of the position.

In step S120, among the properties of each operation of the operation sequence created in step S110, parameters other than the parameters for quantitatively defining the position of the control point are set. More specifically, the user performs processing, such as inputting characters or numbers to a user interface displayed on the display 602 of the setting device 600, selecting one from options, and the like, and creates properties. In addition, as will be described later, the processing of steps S110 to S140 can be repeatedly performed. Therefore, before the creation of the operation sequence in step S110 is completed, the processing of step S120 can be performed for each individual operation.

In step S130, among the parameters of each operation of the operation sequence created in step S110, the value of the parameter for determining the control point of the robot 100 is determined. More specifically, the arm 110 and the end effector 200 of the robot 100 are controlled by the user via the setting device 600 and are moved to a desired position, and as the position is stored as a teaching point, the value of the parameter for determining the control point of the robot 100 is determined. The processing is also referred to as "Jog and Teach".

In step S140, by pressing a predetermined button included in the user interface to be displayed on the display 602 of the setting device 600, the operation sequence including the set parameters is converted into a program file. The generated program file is stored in the RAM 630 of the setting device 600 and is also transmitted to the robot control device 300.

In step S150, the user determines whether or not the operation sequence created in steps S110 to S130 may be confirmed. In a case of confirming the created operation sequence, the processing proceeds to step S200. In a case of further editing the created operation sequence, the processing returns to step S110.

In step S200, the robot control device 300 operates the workstation WS (refer to FIG. 2) including the robot system 1 in accordance with the program created in step S100. In other words, in step S110, based on the operation sequence edited via at least one of the first edit screen De1 and the second edit screen De2 which will be described later, the robot control device 300 controls the robot 100, the processing device 800, and the warning lamp 900.

Figure 4:
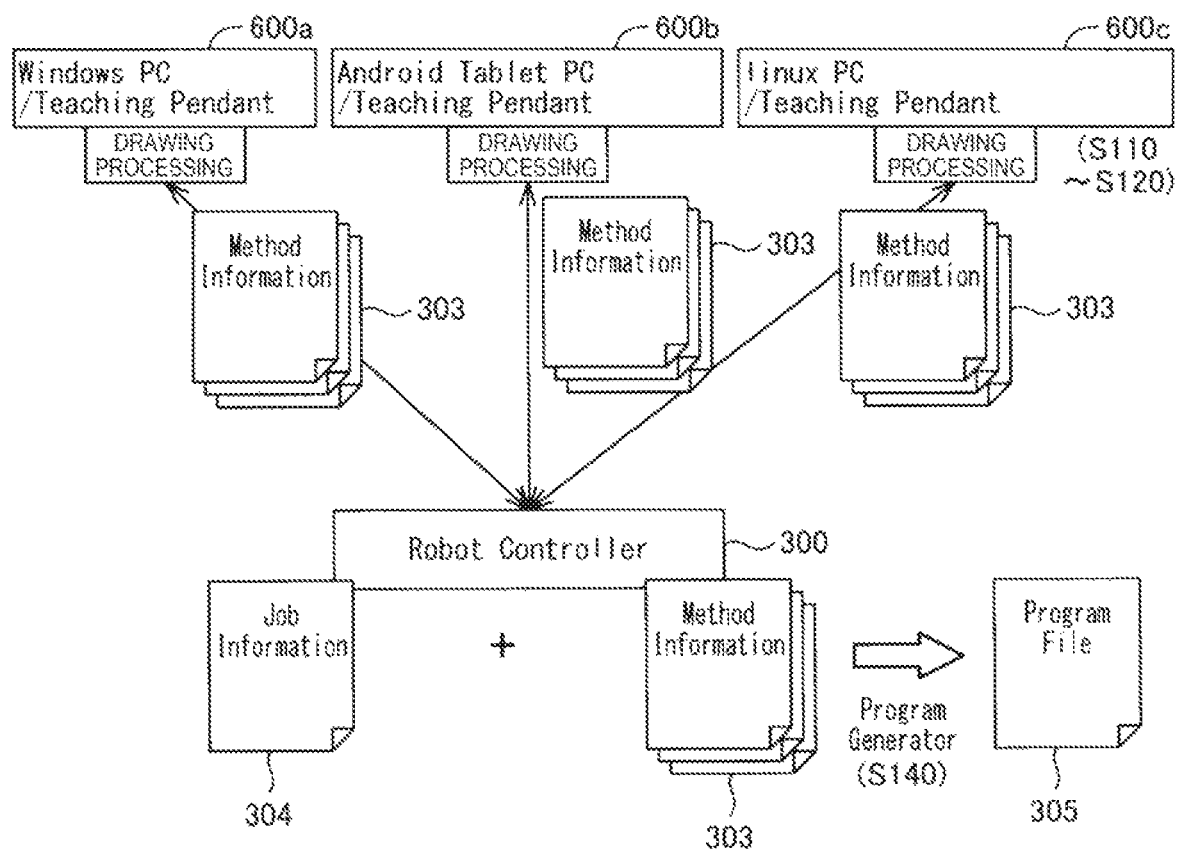
FIG. 4 is a block diagram illustrating processing of a setting device and a robot control device in step S100 of FIG. 3.

FIG. 4 is a block diagram illustrating processing of the setting device 600 and the robot control device 300 in step S100 of FIG. 3. In FIG. 4, as an example of the setting device 600, three setting devices 600 having different OS for controlling the setting device 600 that serves as a computer are illustrated. In other words, as an example of the setting device 600, a computer 600*a* controlled by Windows (registered trademark), a computer 600*b* controlled by Android (registered trademark), and a computer 600*c* controlled by Linux (registered trademark) are illustrated. Each of the computers 600*a* to 600*c* may be connected to the robot control device 300 via the teaching pendant.

The robot control device 300 stores method information 303 in the RAM 330 (refer to FIG. 1). The method information 303 is information on each operation that can be included in the operation sequence. For example, the setting device 600 refers to the method information 303 and displays an image that corresponds to the operation. The method information 303 is stored in the RAM 330 of the robot control device 300 as data in a format independent from an operating system (OS). As the method information 303 is newly stored in the RAM 330, an operation that can be executed by the workstation WS is added.

In steps S110 to S130 of FIG. 3, when the operation sequence of each configuration element (specifically, the robot 100, the processing device 800, and the warning lamp 900) of the workstation WS is edited, the setting device 600 creates job information 304. The job information 304 is information in which the operation sequence of one configuration element included in the workstation WS is defined. The job information 304 includes information on the operations that configure the operation sequence and the arrangement order of the operations, and the information on the properties (parameters) of each operation. The job information 304 is created for each configuration element which is a control target included in the workstation WS.

Figure 5:
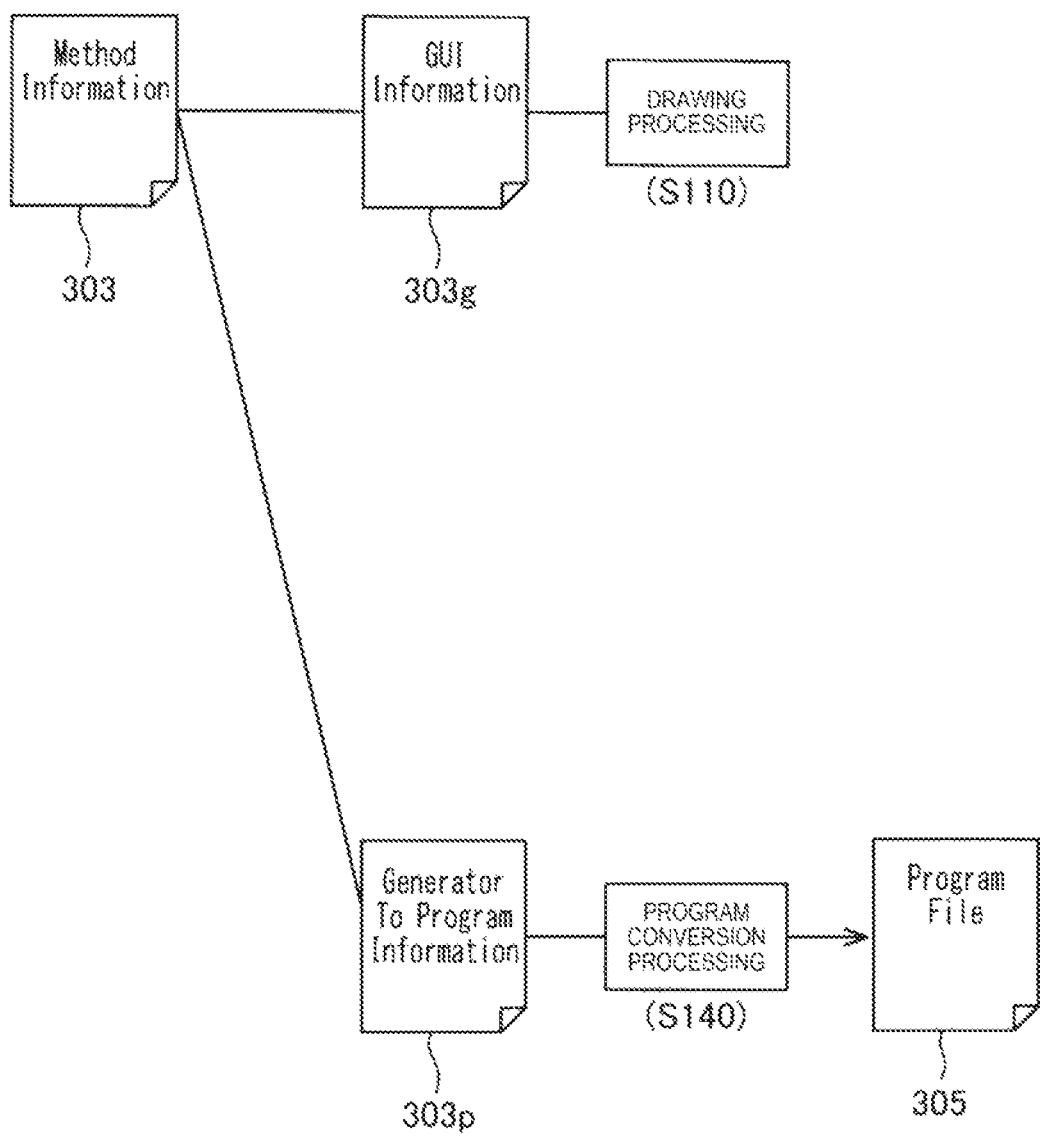
FIG. 5 is a diagram illustrating functions of GUI information and program generation information.

FIG. 5 is a diagram illustrating functions of GUI information 303*g* and program generation information 303*p*. The method information 303 (refer to FIG. 4) includes the GUI information 303*g* and the program generation information 303*p*.

The GUI information 303*g* is information in which the operation and the image to be displayed regarding the operation on the first edit screen De1 to be displayed on the display 602 of the setting device 600 are correlated with each other. The image to be displayed regarding the operation on the first edit screen De1 includes an image representing the operation itself and an image of the interface for setting the properties of the operation. In addition, in the specification, "image" includes a display showing characters and symbols.

In steps S110 and S120 of FIG. 3, the setting device 600 refers to the GUI information 303*g* and displays the image stored as the image regarding the operation while the GUI information 303*g* is correlated with the operation, on the first edit screen De1 on the display 602. By displaying the first edit screen De1 including the image representing the operation on the display 602, it is possible to present the user with the first edit screen De1 which is intuitively easy to understand.

The program generation information 303*p* includes information in which an operation and an expression in a programming language representing the operation are correlated with each other. In step S140 of FIG. 3, the setting device 600 refers to the program generation information 303p and converts the operation sequence edited via the first edit screen De1 into a program file 305 (refer to also FIG. 4). In addition, in steps S110 and S120 after step S140 (refer to FIG. 3), the setting device 600 displays the program file 305 including the expression in the programming language within the second edit screen De2 to be displayed on the display 602. As a result, the user is presented with the second edit screen De2 of which detailed operation contents can be understood in detail.

After this, in step S140 of FIG. 3, the setting device 600 refers to job information 304 and the program generation information 303p of the method information 303, and converts the operation sequence of all of the configuration elements which are control targets included in the workstation WS into the program file 305 to be passed to the robot 100 (refer to also FIG. 4). As a result, the program file 305 includes an order of the operations of all of the configuration elements which are control targets included in the workstation WS, the parameters of the operations included in the operation sequence, and the setting values of the parameters of the respective operations.

A4. First User Interface for Creating Operation Sequence:

In the embodiment, in the setting device 600, two types of user interfaces are prepared as the user interface (refer to S110 in FIG. 3) for creating the operation sequence. The first user interface is a user interface for a user who does not have a special skill. A second user interface is a user interface for a user who has an advanced programming skill. Here, the creation of the operation sequence by the first user interface will be described.

Figure 6:
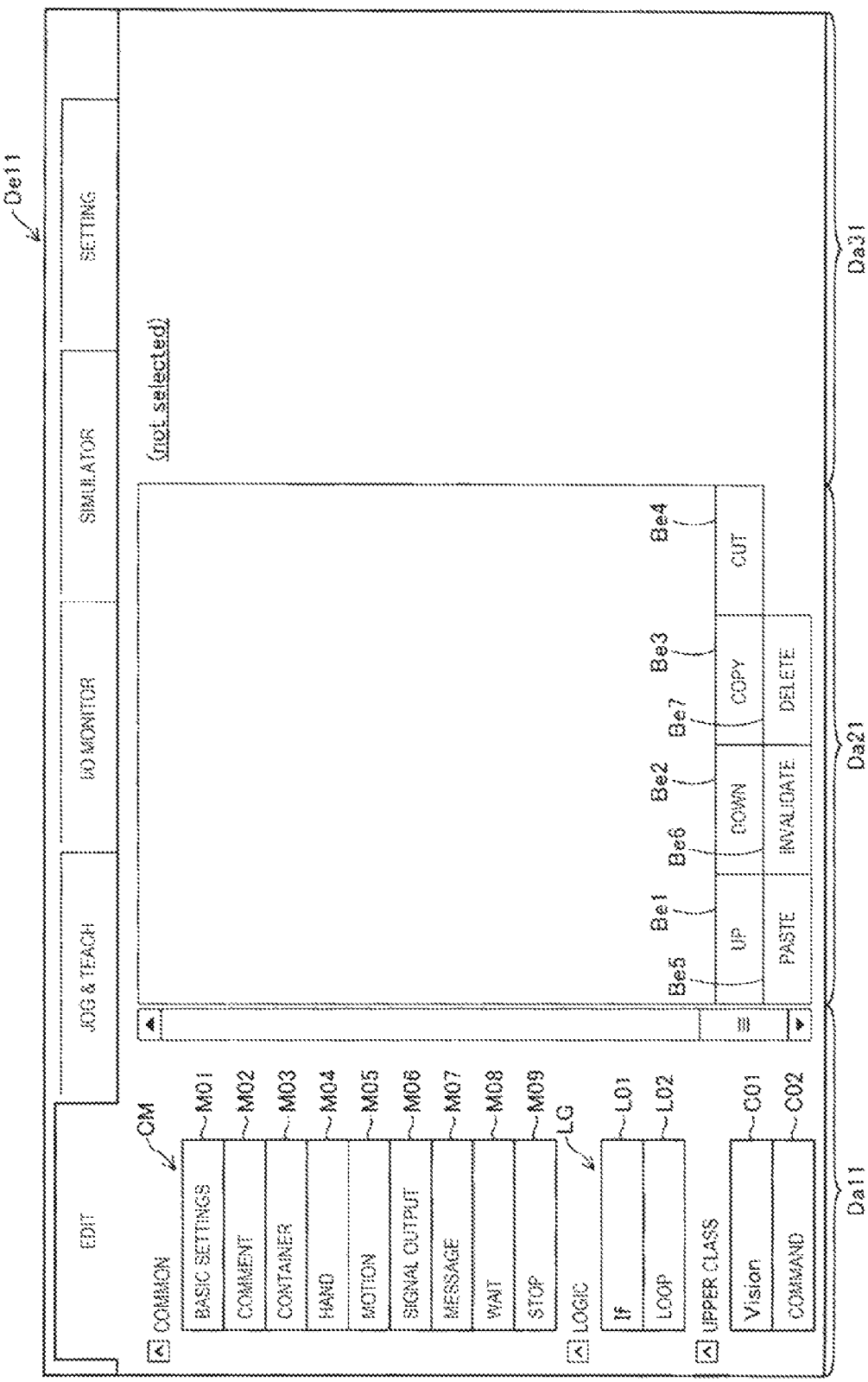
FIG. 6 is a diagram illustrating a display on a display of the setting device in a state before a user selects an operation that configures an operation sequence in step S110 of FIG. 3.

FIG. 6 is a diagram illustrating a display on the display 602 of the setting device 600 in a state before the user selects the operation that configures the operation sequence in step S110 of FIG. 3. When creating the operation sequence, an "Edit" tag in the upper left is selected in the display of FIG. 6. Then, on the display 602, a first edit screen De11 is illustrated. The first edit screen De11 includes a first display part Da11, a second display part Da21, and a third display part Da31. The first display part Da11, the second display part Da21, and the third display part Da31 are displayed in parallel in this order from the left to the right on the display 602 of the setting device 600.

The first display part Da11 further includes an operation display CM that represents a plurality of selectable operations in creating the operation sequence. In the example of FIG. 6, the operation display CM representing the operation includes images of "Hand" M04, "Motion" M05, "Signal Output" M06, "Message" M07, "Wait" M08, and "Stop" M09. The first display part Da11 also includes other displays. In addition, in the embodiment, the following description will be made while the images of "Basic Settings" M01, "Comments" M02, and "Container" M03 are also "operation display" in a broad sense.

The "Basic Settings" M01 is an image for performing processing for determining basic settings of one operation subject, such as the robot 100 or the processing device 800. The "Comments" M02 is an image for comments embedded in the program list expressed in the programming language displayed at the second display part Da2 which will be described later. The comments are embedded in the program list in order to make it easy for the user to understand the contents of the operation sequence displayed at the second display part Da2.

The "Container" M03 is an image for a set of a plurality of operations. The "Container" will be described later. The "Hand" M04 is an image representing processing in which a manipulator that serves as the end effector 200 is a control target. The "Motion" M05 is an image representing an operation of moving the control target. The "Signal Output" M06 is an image representing an operation in which the control target that serves as an operation subject outputs a signal to the outside. The "Message" M07 is an image representing an operation in which the control target that serves as an operation subject outputs a message that can be recognized by the user to the outside. The "Wait" M08 represents an operation for stopping the processing until a predetermined event occurs. The "Stop" M09 is an image representing processing for stopping the operation that has been performed so far.

The first display part Da11 further includes an operation display LG representing a plurality of logics that can be selected in creating the operation sequence. In the example of FIG. 6, the operation display LG representing the operation includes images of "If" L01 and "Loop" L02. In addition, in the embodiment, the following description about the technology will be made while the "If" L01 and the "Loop" L02 are also "operation display" in a broad sense.

The first display part Da11 further includes "Vision" C01 which is an operation display representing an operation that can be selected in creating the operation sequence. The "Vision" C01 is an image representing a set of operations that moves to a point determined based on the position detected from the image acquired by the camera 700. The processing represented by the "Vision" C01 is one type of "Container". The "Vision" C01 will be described later.

The first display part Da11 further includes a "Command" button C02 which is used to switch the screen in creating the operation sequence. When the "Command" C02 is pressed, the display of the second display part Da2 is switched to the second edit screen De2. The second edit screen De2 will be described later in detail.

At the second display part Da21, the operation sequence is displayed in a format of arrangement of operations selected via the first display part Da11. At the second display part Da21, the operation sequence can be edited by editing the arrangement of the operations. In a state of FIG. 6, since the user has not yet selected the operations that configure the operation sequence, the image representing the operation sequence is not displayed at the second display part Da21. By selecting the display from the operation display CM of the first display part Da11, and by dragging the display onto the second display part Da21, the user can select the operations that configure the operation sequence.

Edit buttons Be1 to Be7 are included in the lower part of the second display part Da21. The functions of the edit buttons Be1 to Be7 will be described later.

At the third display part Da31, the properties of the operations included in the operation sequence displayed at the second display part Da21 are displayed, and the values of the properties are set. In the state of FIG. 6, since the user has not yet selected the operations that configure the operation sequence, the image related to the properties of the operations is not displayed at the third display part Da31.

Figure 7:
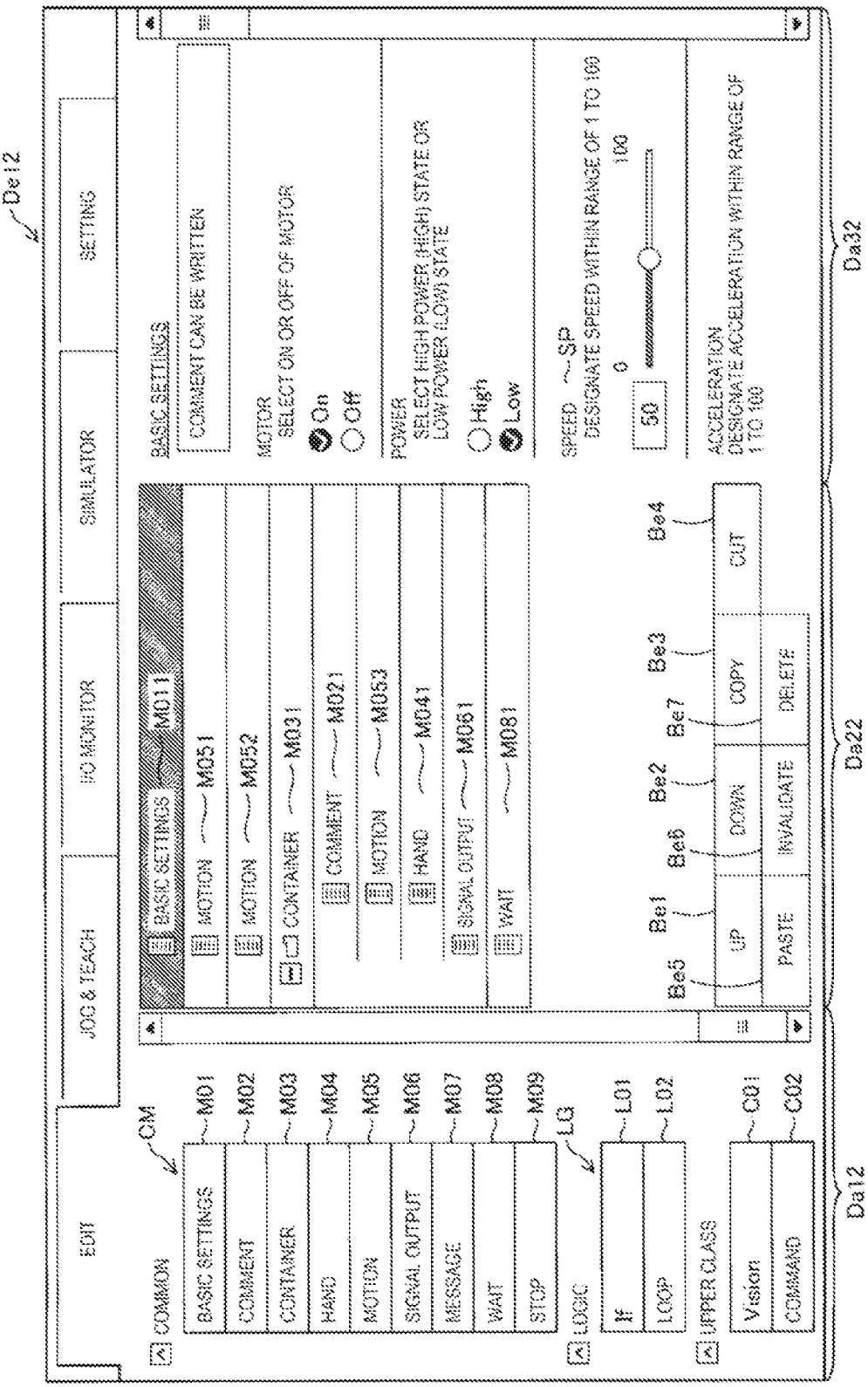
FIG. 7 is a diagram illustrating a display on the display of the setting device in a state after the user selects the operation that configures the operation sequence in step S110 of FIG. 3.

FIG. 7 is a diagram illustrating the display on the display 602 (refer to FIG. 1) of the setting device 600 in a state after the user selects the operation that configures the operation sequence in step S110 of FIG. 3. On the display 602, a first edit screen De12 is illustrated. The first edit screen De12 is a first edit screen obtained by altering the display of the first edit screen De11 of FIG. 6 as the user selects the operation that configure the operation sequence. The first edit screen De12 includes a first display part Da12, a second display part Da22, and a third display part Da32. The first display part Da12, the second display part Da22, and the third display part Da32 are displayed in parallel in this order from the left to the right on the display 602 of the setting device 600. The first display part Da12, the second display part Da22, and the third display part Da32 respectively correspond to the first display part Da11, the second display part Da21, and the third display part Da31.

The first display part Da12 is the same display as the first display part Da11.

At the second display part Da22, the operation sequence is displayed as the arrangement of displays representing the operations selected via the first display part Da11. More specifically, the displays M011, M051, M052, M031, M021, M053, M041, M061, and M081 representing the operations are arranged in parallel from the top to the bottom in a tabular form respectively as one or more rows. Therefore, the user can intuitively grasp the operation sequence as processing in which each operation is executed in order from the top to the bottom.

The "Basic Settings" M011 is displayed at the second display part Da22 by dragging the "Basic Settings" M01 of the first display part Da12 to the second display part Da22. The "Motion" M051 is displayed at the second display part Da22 by dragging the "Motion" M05 of the first display part Da12 to the second display part Da22. Similarly, among the displays within the second display part Da22, a display of which the first three digits of the sign attached to the display match the sign attached to the display within the first display part Da12, is a display displayed within the second display part Da22 by dragging the corresponding display within the first display part Da12.

The edit buttons Be1 to Be7 are displayed at the lower part of the second display part Da22. The operation displayed at the upper part of the second display part Da22 can be edited by the edit buttons Be1 to Be7. When the user clicks and selects a display that corresponds to each operation displayed at the upper part of the second display part Da22 and presses the "Up" button Be1, the clicked operation moves to the next higher row in the display at the upper part of the second display part Da22. Similarly, when the "Down" button Be2 is pressed, the clicked operation moves to the next lower row in the display at the upper part of the second display part Da22. Similarly, the "Copy" button Be3 has a copy function. The "Cut" button Be4 has a cutting function. The copy or cut operation is stored in the RAM 630 and is pasted within the display at the upper part of the second display part Da22 by pressing the "Paste" button Be5.

The "Delete" button Be7 has a cutting function. When the user clicks and selects a display that corresponds to each operation displayed at the upper part of the second display part Da22 and presses the "Invalidate" button Be6, the clicked operation is processed similarly to that in a case of not being displayed at the upper part of the second display part Da22 in processing of steps S120 to S140 and S200 of FIG. 3 while being displayed at the upper part of the second display part Da22. In addition, FIG. 7 illustrates a state where the display M011 of "Basic Settings" among each operation displayed at the upper part of the second display part Da22 is clicked. The display M011 of the "Basic Settings" is displayed in a color different from that before being clicked.

In addition, the operation displayed at the upper part of the second display part Da22 can also be edited by drag-and-drop with a mouse 605 and by manipulating with a keyboard 604 (for example, ctrl+C, ctrl+V, and the like).

At the third display part Da32, the properties of the selected operations among the operations included in the operation sequence displayed at the second display part Da22 are displayed. Specific contents of the selected operation properties are set via the third display part Da32 (refer to S120 of FIG. 3). In a state of FIG. 7, since the display M011 of "Basic Settings" is selected at the second display part Da22, at the third display part Da32, a screen for setting the properties of the basic settings is displayed.

At the third display part Da32, ON or OFF of the motor can be set as the property of the basic settings. At the third display part Da32, regarding the power of the motor, low power or high power of the motor can be set as the properties of the basic settings. At the third display part Da32, regarding the operation speed of the robot 100, any value from 1 to 100 can be set as the properties of the basic settings. At the third display part Da32, regarding the acceleration of both of the speed increasing and the speed reducing, any value from 1 to 100 can be set as the properties of the basic settings. However, in FIG. 7, a part of the properties of the acceleration is out of the display range of the screen. The setting of acceleration becomes possible by sliding the display of the third display part Da32 upward.

Figure 8:
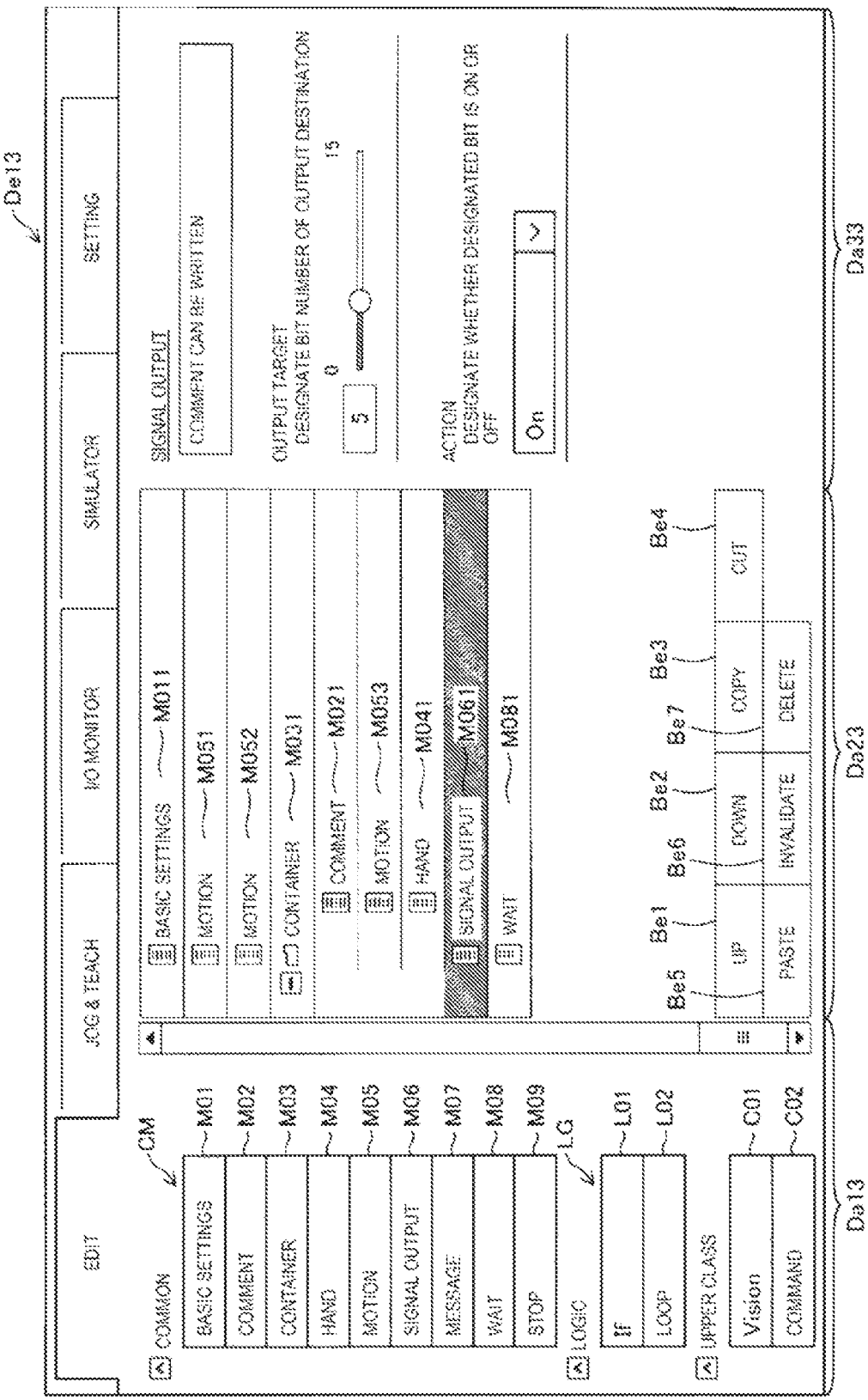
FIG. 8 is a diagram illustrating a first edit screen in a case where a display of "Signal Output" is selected instead of a display of "Basic Settings" on a first edit screen of FIG. 7.

FIG. 8 is a diagram illustrating a first edit screen De13 in a case where the display M061 of "Signal Output" is selected instead of the display M011 of "Basic Settings" on a first edit screen De12 of FIG. 7. The first display part Da13, the second display part Da23, and the third display part Da33 which are included in the first edit screen De13 respectively correspond to the first display part Da11, the second display part Da21, and the third display part Da31 of FIG. 6. In addition, the first display part Da13, the second display part Da23, and the third display part Da33 respectively correspond to the first display part Da12, the second display part Da22, and the third display part Da32 of FIG. 7.

In a state of FIG. 8, since the display M061 of "Signal Output" is selected, at the third display part Da33, a screen for setting the properties of the signal output is displayed. At the third display unit Da33, a bit number of output destination from 1 to 15 can be set as the properties of the signal output. At the third display part Da34, it is possible to set whether the designated bit is turned on or off as the properties of the signal output.

Figure 9:
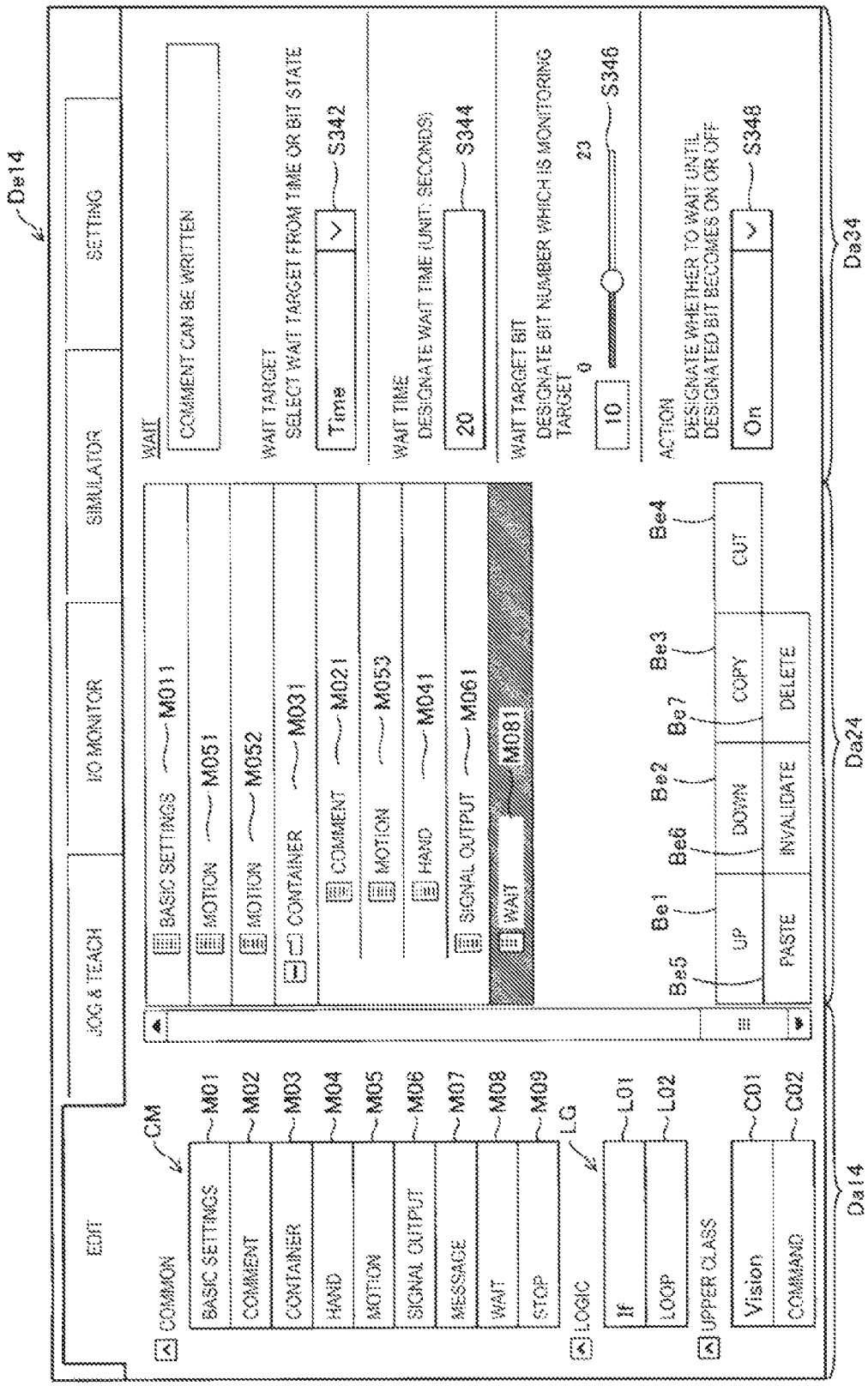
FIG. 9 is a diagram illustrating a first edit screen in a case where a display of "Wait" is selected instead of the display of "Basic Settings" on the first edit screen of FIG. 7.

FIG. 9 is a diagram illustrating a first edit screen De14 in a case where the display M081 of "Wait" is selected instead of the display M011 of "Basic Settings" on the first edit screen De12 of FIG. 7. The first display part Da14, the second display part Da24, and the third display part Da34 which are included in the first edit screen De14 respectively correspond to the first display part Da11, the second display part Da21, and the third display part Da31 of FIG. 6. In addition, the first display part Da14, the second display part Da24, and the third display part Da34 respectively correspond to the first display part Da12, the second display part Da22, and the third display part Da32 of FIG. 7. The first display part Da14, the second display part Da24, and the third display part Da34 respectively correspond to the first display part Da13, the second display part Da23, and the third display part Da33 of FIG. 8.

In a state of FIG. 9, since the display M081 of "Wait" is selected, at the third display part Da34, a screen for setting the properties of "Wait" is displayed. At the third display part Da34, the wait condition that serves as the properties of "Wait" can be selected from "Time" and "Bit State" via a display S342.

At the third display part Da34, the length of the wait time in a case where "Time" is selected as the wait condition is set via an input window S344. The number of the target bits in a case where the "Bit State" is selected as the wait condition is set via a slider S346. ON or OFF can be set as the state of the target bit in a case where the "Bit State" is selected as the wait condition via a display S348.

In addition, there is a case where the "Time" and the "Bit State" that serve as the wait conditions selected via the display S342 is referred to as "Event Type" in the specification. There is a case where "Length of Wait Time", "Target Bit Number", and "ON/OFF" that serve as wait conditions set via the displays S344, S346, and S348 are referred to as "Event State" in the specification.

In the embodiment, for a wait operation of stopping the processing until a predetermined event occurs, as properties, (i) selection of time and bit number that serve as "Event Type" and (ii) ON/OFF of the length or the bit of the time that serves as "Event State", are included. In addition, at the third display part Da3 of the first edit screen De1, "Event Type" and "Event State" are displayed in order from the top to the bottom. Therefore, the user can set the properties in order according to the arrangement order on the screen. Therefore, it is possible to efficiently create the operation sequence of the robot 100.

In addition, regardless of the transition state of the screen, the first edit screens De11 to De14 are collectively referred to as "first edit screen De1". The same situation is also applied to display parts De16 to De18 of FIGS. 17 to 19 and display parts De1A and De1B of FIGS. 20 and 21 which will be described later. The first edit screen De1 is a user interface in which images representing one or more operations are selected among the images representing the plurality of operations and the operation sequence of the robot can be edited by arranging the images on the screen. In addition, in the specification, "Edit" is not limited to modifying a part or the entirety of already existing operation sequence, but also includes generation of an operation sequence from a state where an operation sequence is not defined at all.

Regardless of the transition state of the screen, the first display parts Da11 to Da14 of the first edit screen De1 are collectively referred to as "first display part Da1". The same situation is also applied to display parts Da16 to Da18 of FIGS. 17 to 19 and display parts Da1A and Da1B of FIGS. 20 and 21 which will be described later. The first display part Da1 is a user interface representing a plurality of selectable operations.

Regardless of the transition state of the screen, the second display parts Da21 to Da24 of the first edit screen De1 are collectively referred to as "second edit part Da2". The same situation is also applied to display parts Da26 to Da28 of FIGS. 17 to 19 and display parts Da2A and Da2B of FIGS. 20 and 21 which will be described later. The second display part Da2 is a user interface in which the operation sequence is displayed as the arrangement of operations selected via the first display part Da1, and the operation sequence can be edited by editing the arrangement operations.

Regardless of the transition state of the screen, the third display parts Da31 to Da34 of the first edit screen De1 are collectively referred to as "third display part Da3". The same situation is also applied to display parts Da36 to Da38 of FIGS. 17 to 19 and a display part Da3A of FIG. 20 which will be described later. The third display part Da3 is a user interface in which the properties of operations included in the operation sequence displayed at the second display part Da2 are displayed and the values of the properties can be set.

In the embodiment, on the first edit screen De1, the first display part Da1, the second display part Da2, and the third display part Da3 are displayed in parallel in this order. Therefore, on the first edit screen De1, for the second display part Da2 which displays the operation sequence that serves as the edit target, the user can select an operation and incorporate the operation into the operation sequence that serves as the edit target at the first display part Da1 on one side, and can set the properties of each operation at the third display part Da3 on the other side. Accordingly, it is possible to efficiently create the operation sequence of the robot.

More specifically, on the first edit screen De1, the first to third display parts Da1 to Da3 are displayed in parallel in order from the left to the right. Therefore, on the edit screen, for the second display part Da2 which displays the operation sequence that serves as the edit target, the user can select an operation and incorporate the operation into the operation sequence that serves as the edit target at the first display part Da1 on the left side. In addition, for the second display part Da2, at the third display part Da3 on the right side, the properties of each operation can be set. Therefore, it is possible to efficiently create the operation sequence of the robot.

The program file including the operation sequence edited via the first edit screen De1 and information on the properties set via the first edit screen De1 is created in step S140 of FIG. 3. FIG. 1 illustrates a functional unit of the CPU 610 of the setting device 600 for creating the program file in step S140 as "file creation unit 614".

In a case where the created program file contains only the information of the operation sequence and does not contain the information on the properties, in order to operate the robot using the program file (refer to S200), it is necessary to write the information on the properties into the program file. However, in the embodiment, since a program file including not only the operation sequence but also the information of the property information is created, it is possible to operate the robot 100 using the created program file.

Figure 10:
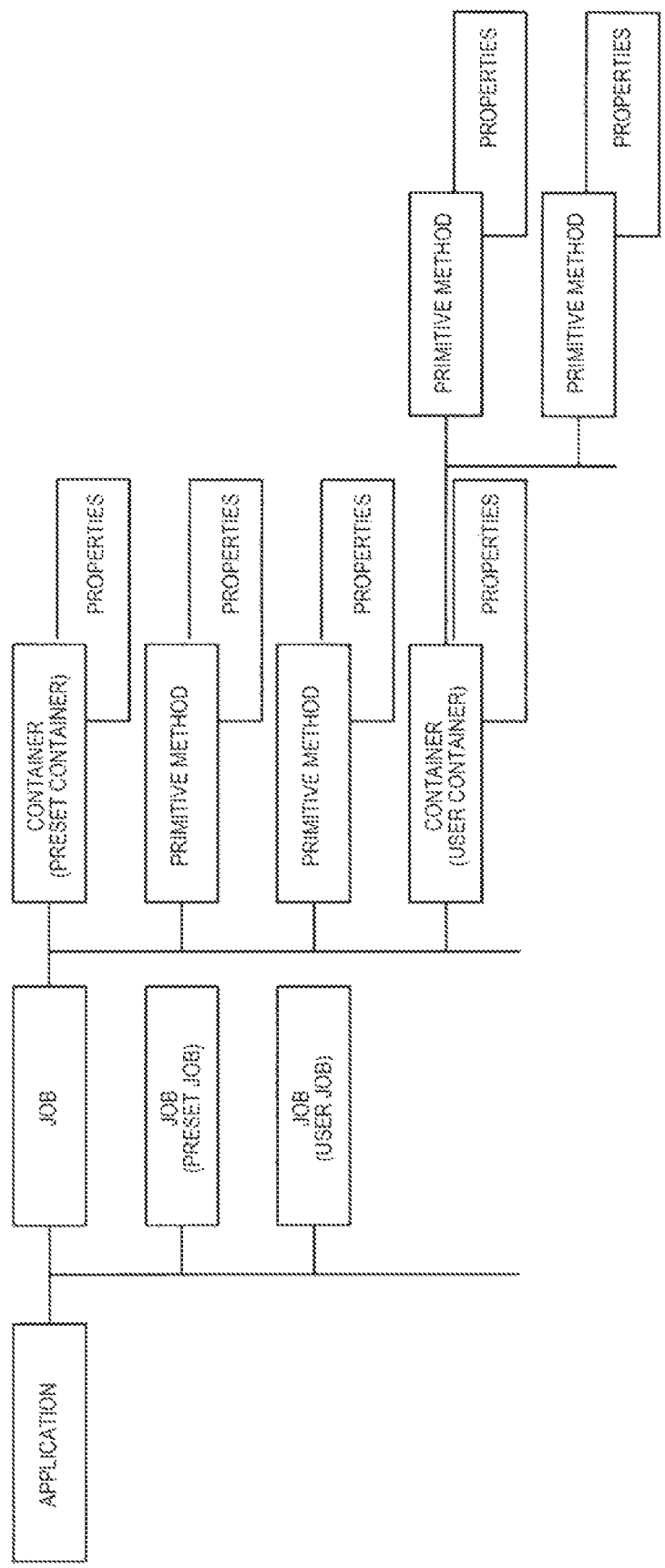
FIG. 10 is an explanatory diagram exemplifying a relationship of "Application", "Job", "Method", "Properties", and "Container".

FIG. 10 is an explanatory diagram exemplifying a relationship of "Application", "Job", "Method", "Properties", and "Container". In creating the operation sequence of the workstation WS in the setting device 600, concepts of "Application", "Job", "Method", "Properties", and "Container" are used (refer to 303 and 304 in FIG. 4).

The "Application" is a concept representing the entire operation sequence of the configuration elements which are control targets included in the workstation WS. The "Application", for example, is a series of work in which, in the workstation WS illustrated in FIG. 1, the processing device 800 outputs a signal of completion of processing with respect to the workpiece W01, and in response to the signal, the robot 100 takes out the workpiece W01 from the processing device 800 and puts the workpiece W01 onto the belt conveyor of the transport device 750. By determining the "Application", the contents of the processing in which the robot system 1, the processing device 800, the transport device 750, and the warning lamp 900 of the workstation WS cooperatively operate are determined.

In step S140 of FIG. 3, as illustrated at the second display part Da22 of FIG. 7, the second display part Da23 of FIG. 8, and the second display part Da24 of FIG. 9, the "Application" specified by the arrangement of the displays of the operations is converted, and accordingly, the program file 305 for the workstation WS is created.

In addition, at the second display part Da22 of FIG. 7, the second display part Da23 of FIG. 8, and the second display part Da24 of FIG. 9, in order to make it easy to understand the technology, only the operation sequence of one configuration element among the configuration elements included in the workstation WS is illustrated. However, at the second display part Da2, the operation sequence of all of the configuration elements included in the workstation WS is specified as an arrangement of each operation.

The "Job" means (i) a subject of the operation, or (ii) a set of operations grouped for each subject of the operation. The "Job" is a concept that corresponds to the configuration element (in the embodiment, the robot 100, the processing device 800, and the warning lamp 900) which is a control target, included in the workstation WS. As illustrated in FIG. 10, one or more pieces of "Job" is subordinate to one "Application". The "Job" subordinate to the "Application" corresponds to the configuration element included in the workstation WS to which the "Application" corresponds. In the "Job", there are two types of jobs of "Preset Job" which is prepared in advance and of which the contents are preliminarily determined and "User Job" created by the user (refer to the left side of FIG. 10).

Meanwhile, as conceptual classification, the "Job" includes "Motion Job" that follows the movement with respect to other configuration elements and "Monitoring Job" that does not follow the movement with respect to other configuration elements. The "Motion Job" is, for example, the robot 100, the processing device 800, or a set of the operations of the robot 100 and the processing device 800. The "Monitoring Job" is, for example, the warning lamp 900 or a set of the operations of the warning lamp 900.

The "Method" is an operation of a configuration element which is a control target. As illustrated in FIG. 10, one or more "Methods" are subordinate to one "Job". The "Method" subordinate to the "Job" corresponds to an operation executed by the configuration element that corresponds to the "Job". In the "Method", there are two types of methods of "Primitive Method" and "Container".

The "Primitive Method" is a minimum unit operation. Specifically, the "Primitive Method" is an operation, such as "Hand", "Motion", "Signal Output", "Message", "Wait", and the like (refer to M051, M052, M053, M041, M061, and M081 in FIGS. 7 to 9). In the specification, the "Operation" is used in the meaning of "Primitive Method". The "Primitive Method" is determined in advance. A new "Primitive Method" cannot be created by the user.

The "Container" is a set of one or more the "Primitive Methods" (refer to M031, M053, and M041 in FIGS. 7 to 9). The "Container" can further include one or more "Containers". In the "Container", there are two types of containers of "Preset Container" which is prepared in advance and of which the contents are preliminarily determined and "User Container" created by the user. Empty containers are called "Primitive Containers". The user can edit the operation sequence of the robot 100 by selecting containers including one or more methods via the first edit screen De1 and arranging the containers on the screen.

According to the aspect, the user can edit the operation sequence of the robot 100, for example, by selecting preprepared containers in the setting device 600 and arranging the containers on the screen. In addition, by selecting containers of which at least a part of the method is edited in advance and arranging the containers on the screen, the user can edit the operation sequence of the robot 100. Accordingly, on the first edit screen De1, compared to an aspect in which it is necessary to select and arrange the methods one by one, the user can easily edit the operation sequence of the robot 100.

The "Method" has the "Properties". The "Primitive Method" has the "Properties" of the "Primitive Method". The "Container" has "Properties" of the "Container". The properties of the container constrain the properties of the primitive method included in the container. In other words, when the settings of the properties of the container is specifically determined, the properties of the primitive method included in the container are automatically determined, or a part that cannot be set with respect to the setting range of the properties of the primitive method included in the container is generated.

On the first edit screen De1, the user can set the properties of the method and can set the properties of the container. However, as described above, the properties of the methods included in the container are automatically set in accordance with the properties set for the container. According to the aspect, on the first edit screen De1, compared to an aspect in which it is necessary to set the properties of each method one by one, the user can easily set the properties of a plurality of methods.

Figure 11:
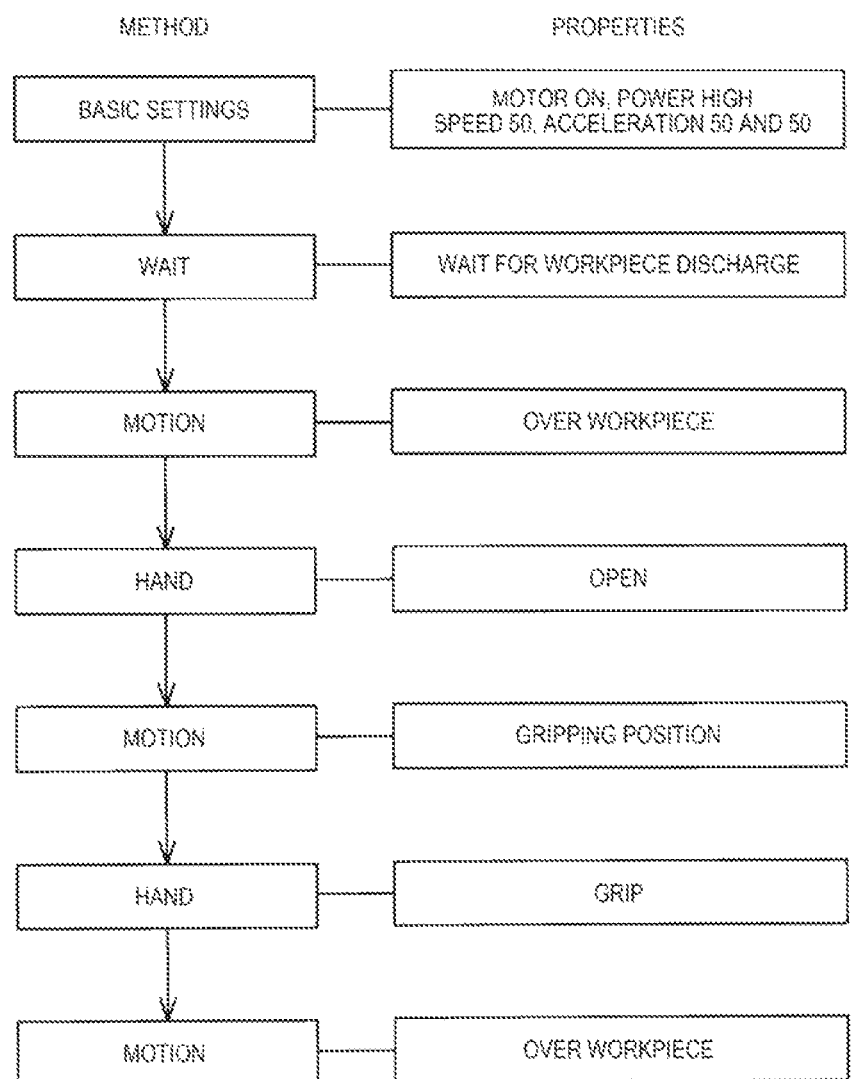
FIG. 11 is an example in which a job is configured only with a primitive method.

FIG. 11 is an example in which the job is configured only with the primitive method. In the example of FIG. 11, the job is a job of the robot 100. In a case of following the job illustrated in FIG. 11, the robot 100 executes the operation defined by the method from the top to the bottom in FIG. 11.

Among the methods included in the job, the method of "Basic Settings" has properties of "Motor ON, Power High, Speed 50, and Accelerations 50 and 50" (refer to Da32 in FIG. 7). In addition, in FIG. 11, the "Accelerations 50 and 50" means that a speed increasing set value is 50 and a speed reducing set value is 50. The method of "Wait" has the properties of "Wait for Workpiece Discharge". More specifically, an operation of waiting until the bit representing that the workpiece W01 has been discharged from the processing device 800 is turned ON is set (refer to Da34 in FIG. 9). The method of first "Motion" has properties of "Over Workpiece". More specifically, the operation of moving the control point (specifically, TCP) to the position above the workpiece W01 is set. In addition, the position of the workpiece W01 is specified based on the image acquired by the camera 700 (refer to FIG. 1).

The method of first "Hand" of FIG. 11 has properties of "Open". More specifically, the operation of opening the hand that serves as the end effector 200 is set. The method of second "Motion" has properties of "Gripping Position". More specifically, the operation of moving the control point to the point where the workpiece W01 can be gripped is set. The method of second "Hand" has properties of "Grip". More specifically, the operation of closing the hand that serves as the end effector 200 is set such that the workpiece W01 can be grasped. The amount by which the hand is closed is determined based on the force sensor 190. The method of third "Motion" has properties of "Over Workpiece". More specifically, the operation of moving the control point on the point where there is the gripped workpiece W01 is set.

Figure 12:
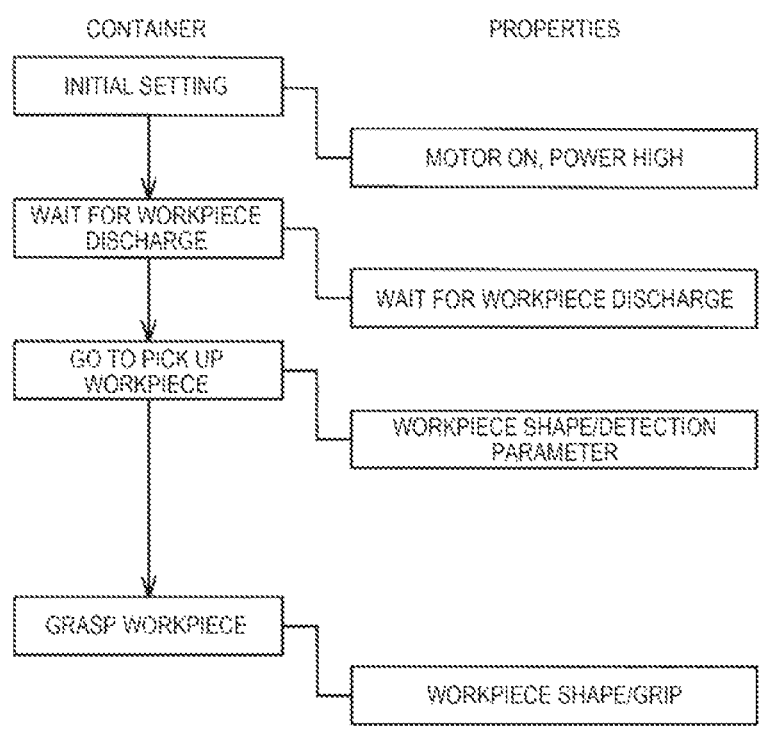
FIG. 12 is an example in which a job is configured only with a preset container.

FIG. 12 is an example in which the job is configured only with a preset container. In the example of FIG. 12, the job is a job of the robot 100. In a case of following the job illustrated in FIG. 12, the robot 100 executes the operation defined by the container from the top to the bottom in FIG. 12. In addition, the container defines an operation that corresponds to one or more methods included in the container.

Among the containers included in the job, a container of "Initial Setting" has properties of "Motor ON and Power High" as properties. As a result, the method of "Basic Settings" belonging to the container of "Initial Setting" automatically has the properties of "Motor ON and Power High" (refer to FIG. 11).

A container of "Wait for Workpiece Discharge" has properties of "Wait for Workpiece Discharge". More specifically, an operation of waiting until the bit representing that the workpiece W01 has been discharged from the processing device 800 is turned ON is set.

A container of "Go to Pick Up Workpiece" has properties of "Workpiece Shape/Detection Parameter". More specifically, the operation of moving the control point (specifically, TCP) to the point of the workpiece W01 detected by the camera 700 is set.

A container of "Grasp Workpiece" has properties of "Workpiece Shape/Grip". More specifically, an operation of gripping the workpiece W01 detected by the camera 700 is set.

As described above, the creation of the operation sequence in step 110 and the setting of the properties of step S120 of FIG. 3 can be executed via the first edit screen De1 that serves as the first user interface. According to the aspect, the user who does not have an advanced programming skill can edit the operation sequence of the robot 100 without performing complicated editing work and can set the properties, by using the first edit screen De1.

A5. Second User Interface for Creating Operation Sequence:

Hereinafter, creation (refer to S110 in FIG. 3) of the operation sequence by the second user interface for the user who has an advanced programming skill will be described.

FIG. 13 illustrates a second edit screen De21. After the processing of step S140 in FIG. 3 is executed, in order to further edit the operation sequence, on the first edit screen De1 illustrated in FIGS. 6 to 9, when the "Command" button C02 in the lower left is pressed, the display on the display 602 is switched. More specifically, instead of the second display part Da2 of the first edit screen De1, the second edit screen De21 is displayed on the display 602.

An operation sequence displayed on the second edit screen De21 is an operation sequence CLM expressed in the programming language, which can be obtained by converting the operation sequence edited via the first edit screen De1 (refer to S140 of FIG. 3). On the second edit screen De21, the operation sequence CLM is displayed as a list in which each operation is disposed as one or more rows from the top to the bottom.

In addition, in a state where the second edit screen De2 is displayed instead of the second display part Da2 of the first edit screen De1 at the center of the display 602, in a case where the "Command" button C02 (refer to FIGS. 6 to 9) of the first display part Da1 is pressed, the display on the display 602 is switched again. More specifically, the second display part Da2 of the first edit screen De1 is displayed at the center of the display 602.

On the second edit screen De21 illustrated in FIG. 13, the character string described after """ is "Comment" (refer to M02 and M021 in FIGS. 7 to 9). The "Comment" is described in order to make it easy for the user to understand the operation sequence CLM expressed in the programming language, and does not define the operation of the control target. The "Application", the "Job", "Container", and the names of each operation (such as, "Basic Settings", "Motion", and the like) are automatically described in the program list as comments.

At a list part CLM011 in the program list, the operation by a function Func_3 that defines "Basic Settings" and the properties of "Motor ON, Power High, Speed 50, and Accelerations 50 and 50" are defined (refer to Da32 in FIG. 7). At a list part CLM051, the operation by a function Func_4 that defines "Motion" and "Speed 10, Accelerations 10 and 10, and Destination Point of Control Point (87.7443, 432.535, 426.704, 174.255, 0.167451, and −177.68)" are defined. In addition, in the specification, the "Destination Point of Control Point" is described including a target arrival point of the control point of the end effector 200 within a three-dimensional space and a target posture at the target arrival point.

At a list part CLM052, the operation by a function Func_5 that defines "Motion" and "Speed 10, Accelerations 10 and 10, and Destination Point of Control Point (−387.67, 210.945, 426.704, −112.83, 0.167492, and −177.68) are defined. At a list part CLM031, operations by functions Func_6, Func_8, and Func_9 that correspond to operations included in the "Container" are defined.

Figure 14:
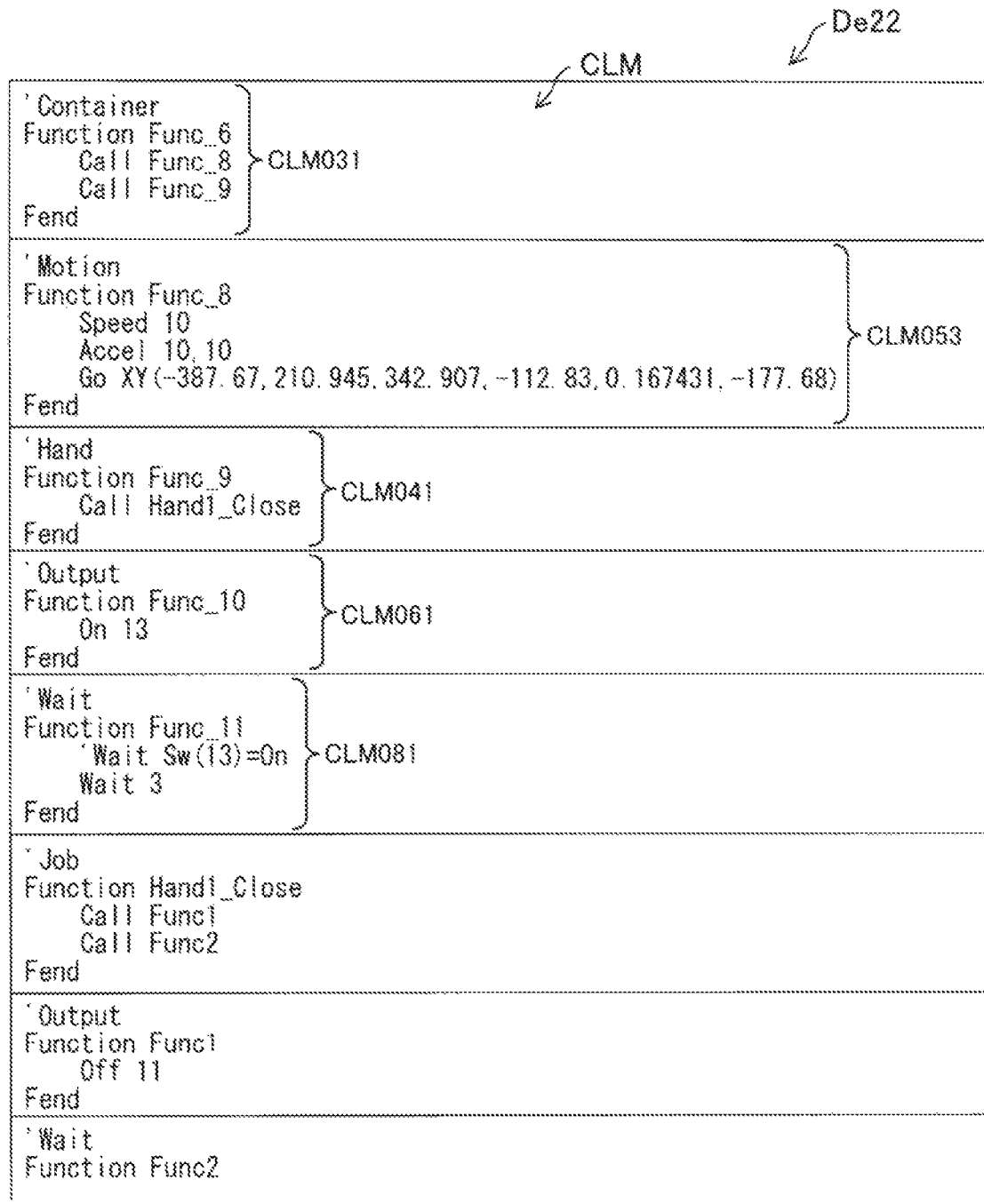
FIG. 14 illustrates a second edit screen.

FIG. 14 illustrates a second edit screen De22. The second edit screen De22 is a second edit screen in a case where the second edit screen De21 of FIG. 13 is scrolled upward. The list part CLM031 displayed at the upper part of FIG. 14 and the list part CLM031 displayed at the lower part of FIG. 13 are the same list part.

At a list part CLM053, the operation by a function Func_8 that defines "Motion" and "Speed 10, Accelerations 10 and 10, and Destination Point of Control Point (−387.67, 210.945, 342.907, −112.83, 0.167431, and −177.68)" are defined. At a list part CLM041 in the program list, the operation by the function Func_9 that defines the "Hand" and the operation of Hand1_Close for defining the operation of "Closing" the hand are defined. At a list part CLM061, the operation by a function Func_10 that defines the "Signal Output" and the properties of "Action ON and Bit Number 13" are defined (refer to Da33 in FIG. 8). At a list part CLM081, the operation by a function Func_11 that defines the "Wait" and the properties of "Wait Time 3 Seconds" are defined (refer to Da34 in FIG. 9). In addition, the properties representing the "Wait Target Bit 13 and Action ON" is added with """ and is made as a comment.

Regardless of the transition state of the screen, the second edit screens De21 and De22 are collectively referred to as "second edit screen De2". The second edit screen De2 is an edit screen on which an operation sequence CLM expressed in the programming language, which can be obtained by converting the operation sequence edited via the first edit screen De1 is displayed, and the operation sequence CLM expressed in the programming language can be edited. The user can edit the character string included in the second edit screen De2 via the keyboard 604 and the mouse 605 that function as the input device of the setting device 600.

When the operation sequence is edited via the first edit screen De1, in a case where the properties are not set (refer to Da32 to Da34 in FIGS. 7 to 9), a location where the properties are supposed to be described on the second edit screen De2 is a blank. The user can write the properties via the second edit screen De2 (refer to S120 in FIG. 3).

The third display part Da3 of the first edit screen De1 provides the user with limited options from all of the setting ranges that can be set for each of the properties by the setting device 600. Therefore, even for a user who does not have a special skill, it is possible to set the properties of the operation sequence. Meanwhile, on the second edit screen De2, from all of the setting ranges that can be set for each of the properties by the setting device 600 without limitation set at the third display part Da3 of the first edit screen De1, the properties of the operation sequence can be set. Therefore, when the operation sequence is edited via the first edit screen De1, even in a case where the properties are set, the user cannot further set the detailed set value of the properties that could not be selected on the first edit screen De1 via the second edit screen De2.

Furthermore, the user can newly describe a method which is not described on the second edit screen De2 at this time via the keyboard 604 and the mouse 605 on the second edit screen De2. In addition, on the second edit screen De2, the user can describe a method that cannot be described on the first edit screen De1.

Therefore, the user who has an advanced programming skill can edit the operation sequence of the robot while designating processing contents of the robot in detail using the second edit screen De2.

FIG. 1 illustrates the functional unit of the CPU 610 of the setting device 600 which displays the first edit screen De1 and the second edit screen De2 on the display 602 that serves as the display unit as the "display control unit 612".

A6. Teaching Operation:

When determining the value of the parameter for determining the control point of the robot 100 (refer to S130 in FIG. 3), in the display (refer to FIGS. 6 to 9) on the display 602 of the setting device 600, a "Jog & Teach" tag in the upper left is selected.

Figure 15:
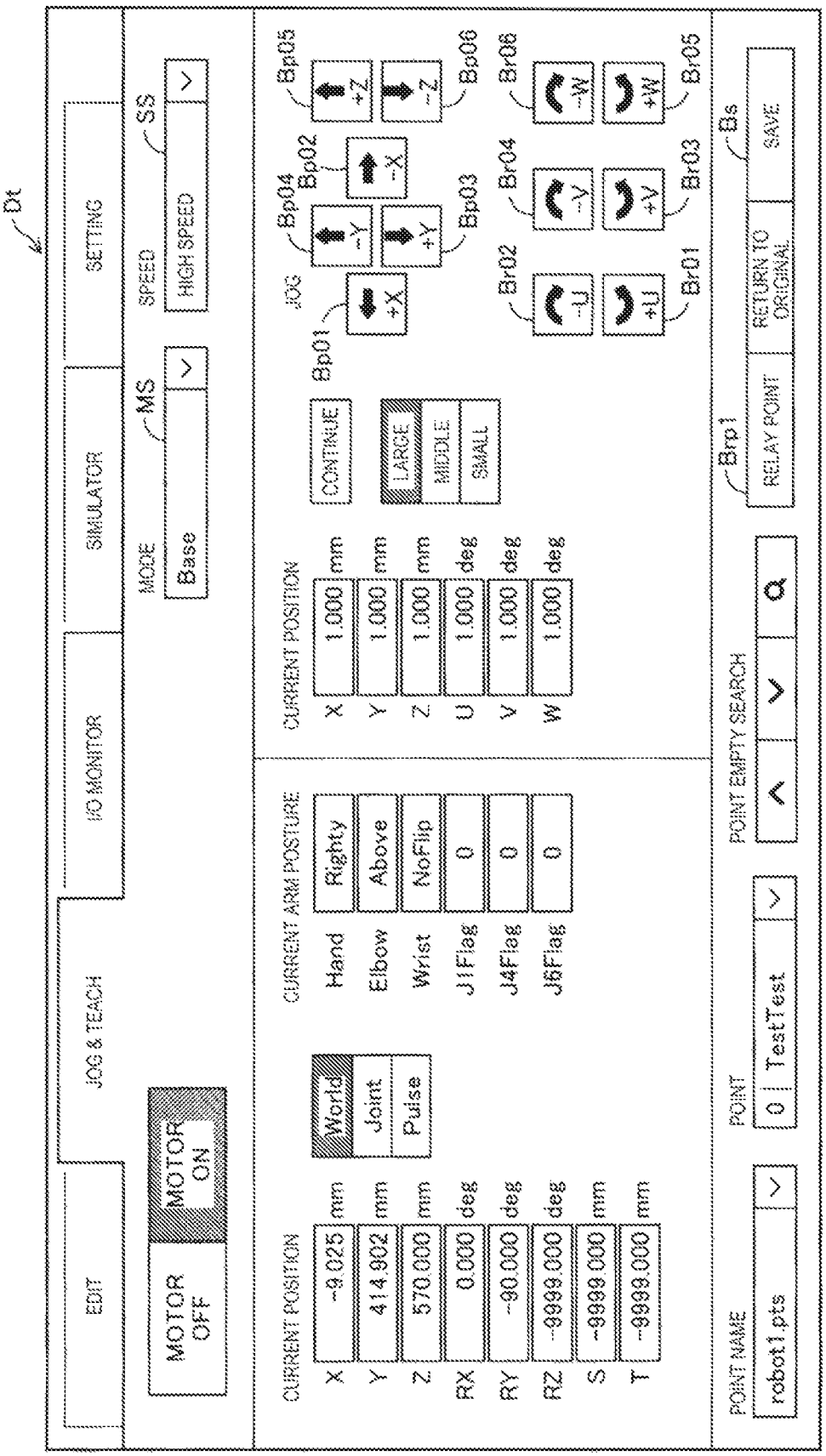
FIG. 15 is a user interface screen when determining values of parameters for determining a control point of a robot.

FIG. 15 is a user interface screen when determining the values of the parameters for determining the control point of the robot 100. When the "Jog & Teach" tag is selected in the display on the display 602 of the setting device 600, a position set screen Dt is shown on the display 602 (refer to FIG. 1). The position set screen Dt includes jog buttons Bp01 to Bp06 and Br02 to Br06.

The button Bp01 is a button for moving the control point in a positive direction of the X axis. The button Bp02 is a button for moving the control point in a negative direction of the X axis. The button Bp03 is a button for moving the control point in a positive direction of the Y axis. The button Bp04 is a button for moving the control point in a negative direction of the Y axis. The button Bp05 is a button for moving the control point in a positive direction of the Z axis. The button Bp06 is a button for moving the control point in a negative direction of the Z axis.

A button Br01 is a button for rotating the control point in a positive direction of a U axis. The button Br02 is a button for rotating the control point in a negative direction of the U axis. The button Br03 is a button for rotating the control point in a positive direction of a V axis. The button Br04 is a button for rotating the control point in a negative direction of the V axis. The button Br05 is a button for rotating the control point in a positive direction of a W axis. The button Br06 is a button for rotating the control point in a negative direction of the W axis.

The user operates the buttons on the position set screen Dt, moves the control point of the end effector 200 to a target position, and achieves a target posture of the end effector 200. In addition, by pressing a save button Bs, the point and posture are stored as a teaching point of the control point in the operation in the sequence determined in step S110 of FIG. 3 (refer to S130 of FIG. 3).

The user can select the type of parameter to be taught by selecting a "Base" mode, a "Joint" mode, a "Tool" mode, and a "World" mode, via a display MS included in the position set screen Dt. The "Base" mode is an operation mode for designating the position of the control point in a coordinate system of which a base to which the robot 100 is attached is an origin. The "Joint" mode is an operation mode for designating the position of the control point at angles of each joint (refer to 510o in FIG. 1). The "Tool" mode is an operation mode for designating the position of the control point in a coordinate system of which the position of the control point at a certain point of time is an origin. The "World" mode is an operation mode for designating the position of the control point in a coordinate system of which a predetermined point or a point determined by the user is an origin.

Via a display SS included in the position set screen Dt, the user can select the operation speed when moving the robot 100 for teaching among "Low Speed", "Normal", and "High Speed.

A7. Setting of Relay Point Determined Based on Sensor Output:

(1) Relay Point Determined Based on Sensor Output:

There is a case where the teaching point of the control point is determined based on the information acquired by the sensor. For example, there is a case where the position of the workpiece W01 is recognized based on the image acquired by the camera 700 (refer to FIG. 1) and the destination point of the control point is determined as a relative position with respect to the position of the workpiece W01. Similarly, there is a case where the position of a predetermined part of the transport device 750 is recognized based on the image acquired by the camera 700 (refer to FIG. 1) and the destination point of the control point is determined as a relative position with respect to the position. In addition, there is a case where the destination point of the control point is determined as a relative position with respect to a position where the output of the force sensor 190 (refer to FIG. 1) is a combination of predetermined values. In the embodiment, such a destination point can be set as follows. Here, an example will be described in which the destination point of the control point is determined as the relative position with respect to the position recognized based on the image acquired by the camera 700.

Figure 16:
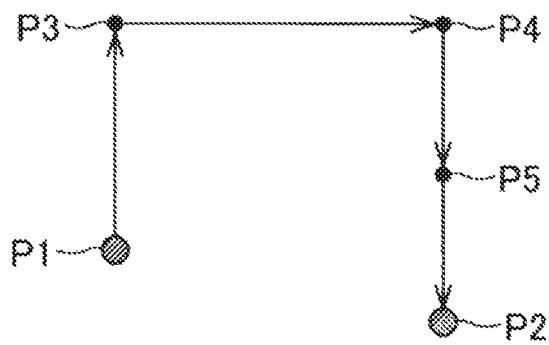
FIG. 16 is an explanatory diagram illustrating relay points when moving from a position recognized based on an image acquired by a camera to a position similarly recognized.

FIG. 16 is an explanatory diagram illustrating relay points P3 to P5 when moving from a position P1 recognized based on the image acquired by the camera 700 to a position P2 similarly recognized. The position P1 is a position of the workpiece W01 recognized from the image. The position P2 is a position of a predetermined part of the transport device 750 recognized from the image. A state where the control point is at the point P1 is supposed to be shifted to a state where the control point is at the position P2, but there is a case where there is an obstacle between the position P1 and the position P2. In order to bypass such obstacles, the relay points P3 to P5 are set.

The relay point P3 is determined as a relative position with respect to the position P1 which is a departure point of the operation. The relay point P4 is determined as a relative position with respect to the position P2 which is a destination point of the operation. The relay point P5 is also determined as a relative position with respect to the position P2 which is a destination point of the operation. Hereinafter, the setting of the operation for moving the control point of the robot 100 in the order of P1, P3, P4, P5, and P2 will be described. In addition, the positions P1 and P2 are also included in the "Relay Point" in a broad sense.

(2) Setting of Relay Point from First Edit Screen:

Hereinafter, an example of setting a relay point for the "Vision" container via the first edit screen De1 in step S110 of FIG. 3 will be described.

Figure 17:
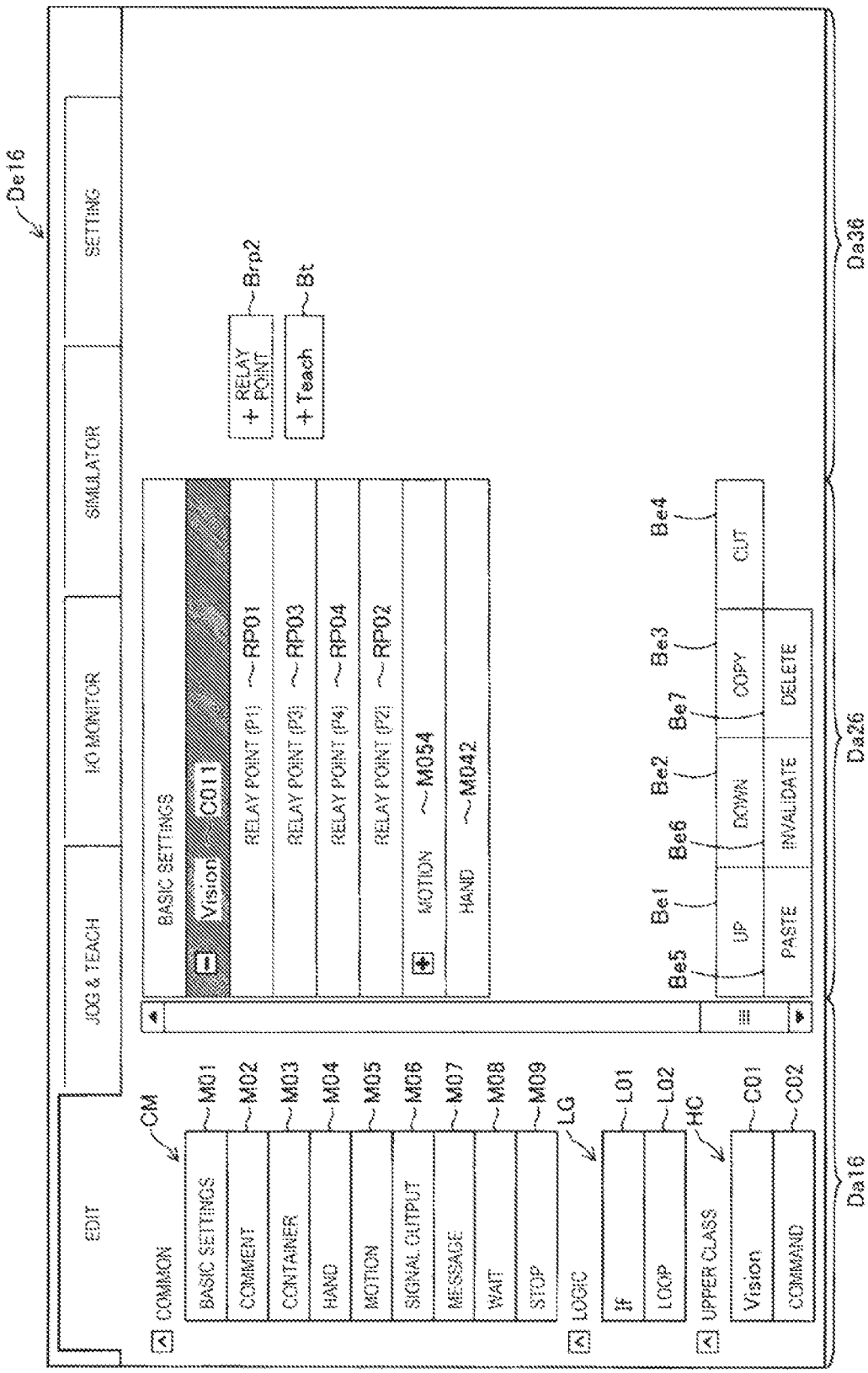
FIG. 17 is a diagram illustrating the display on the display of the setting device in a case where "Vision" which is one type of container is selected on the first edit screen of FIG. 6.

FIG. 17 is a diagram illustrating the display on the display 602 of the setting device 600 in a case where the "Vision" C01 which is one type of container is selected on the first edit screen De11 of FIG. 6. On the display 602, the first edit screen De16 is illustrated. The first edit screen De16 includes the first display part Da16, the second display part Da26, and the third display part Da36. The first display part Da16, the second display part Da26, and the third display part Da36 are displayed in parallel in this order from the left to the right. The first display part Da16, the second display part Da26, and the third display part Da36 respectively correspond to the first display part Da16, the second display part Da26, and the third display part Da36.

On the first edit screen De16, in addition to the "Vision" C01, the "Motion" M05 and the "Hand" M04 are selected and displayed together with the "Vision" C01 at the second display part Da26 (refer to C011, M054, and M042 of FIG. 17).

In a state immediately after the "Vision" C01 is selected at the first display part Da16 and the "Vision" C011 is displayed at the second display part Da26, "Relay Points" RP01 to RP04 are not displayed at the second display part Da26. When the "Vision" C011 is selected at the second display part Da26, a relay point addition button Brp2 and a teaching button Bt are displayed at the third display part Da36.

The relay point addition button Brp2 is a user interface in which a relay point that serves as a teaching point can be added. When the relay point addition button Brp2 is pressed, a relay point that serves as a teaching point is added under the "Vision" container selected at this time. When the relay point addition button Brp2 is pressed in a state where the relay point which is already added is selected, a relay point is added under the relay point selected at this time. Each of the added relay points can be moved up and down under the "Vision" container by the edit buttons Be1 and Be2. The "Relay Points" RP01 to RP04 are displayed at the second display part Da26 after such processing. The "Relay points" RP01 to RP04 are one type of method, and represent an operation which is called "Move to Relay Point".

Figure 18:
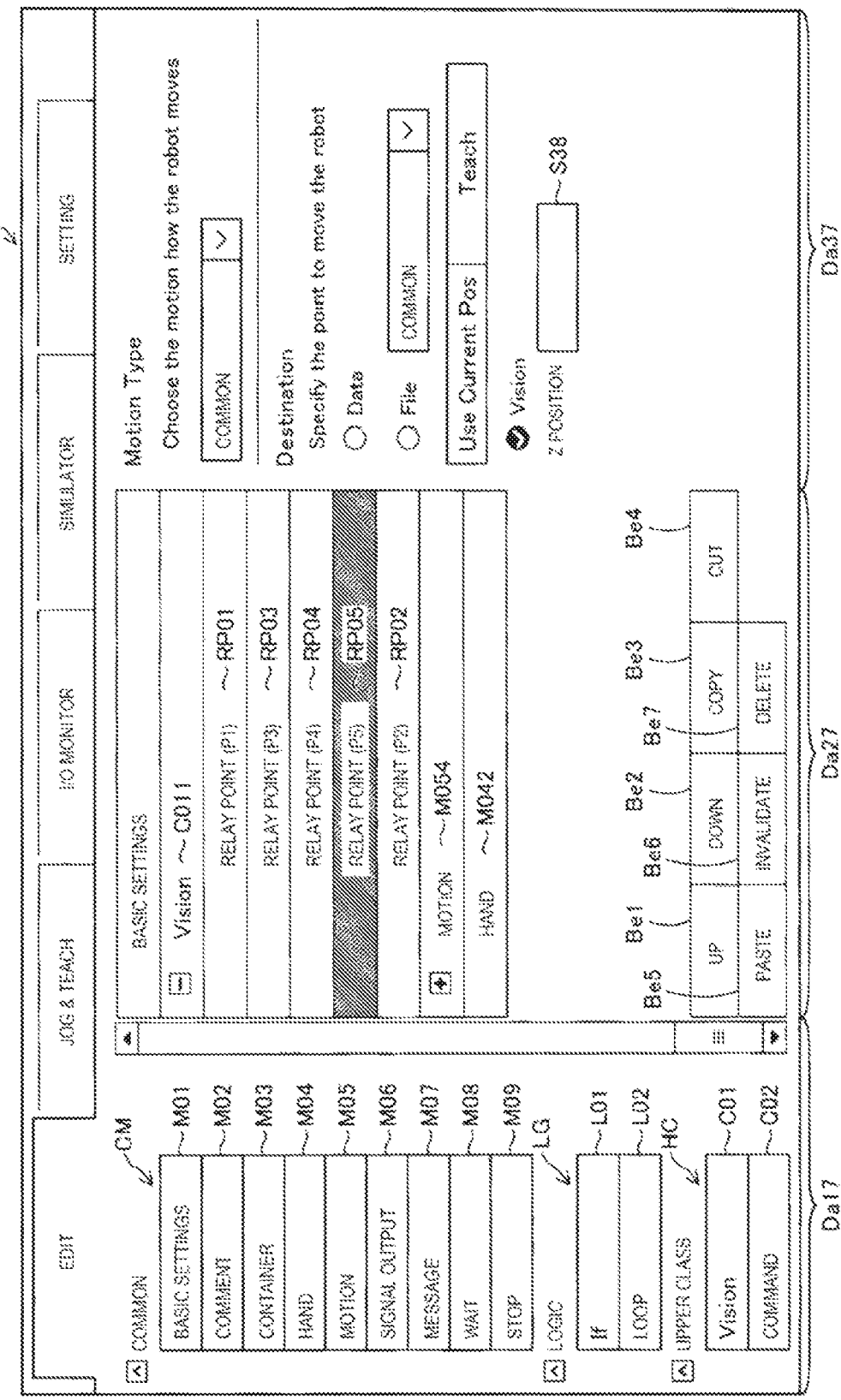
FIG. 18 is a diagram illustrating the display on the display of the setting device in a state where "Relay Point" is added from the state of FIG. 17.

FIG. 18 is a diagram illustrating the display on the display 602 (refer to FIG. 1) of the setting device 600 in a state where a "Relay Point" RP05 is added from the state of FIG. 17. On the display 602, a first edit screen De11 is illustrated. The first edit screen De11 includes a first display part Da17, a second display part Da27, and a third display part Da37. In a state illustrated in FIG. 17, when the relay point addition button Brp2 is pressed, the "Relay Point" RP05 is further added under the "Relay Point" RP02 at the second display part Da27. In addition, when the "Relay Point" RP05 is selected and the "Up" button Be1 is pressed, the "Relay Point" RP05 moves onto the "Relay Point" RP02, and a state of FIG. 18 is achieved.

The set "Relay Points" Rp01 to RP05 can be edited by the edit buttons Be1 to Be1 in the same manner as the other operations.

In the embodiment, on the first edit screen De1, for an operation group including one or more operations performed based on the information acquisition result by the camera 700, it is possible to add a teaching point (relay point P5) representing the position determined based on the information acquisition result by the camera 700 corresponding to one operation (in the embodiment, movement of the control point to a certain position). As a result, operations (here, movement to each relay point) performed based on the information acquisition result by the camera 700 are handled collectively as an operation group in creating the operation sequence of the robot 100. In other words, the operations performed based on the information acquisition result by the camera 700 can be set together with properties. In addition, operations performed based on the information acquisition result by the camera 700 can also be collectively edited, such as moved and deleted. Therefore, compared to a control device in which information acquisition by the camera 700 and movement to a position determined based on the information acquisition result by the camera 700 are set independently, it is possible to easily create the operation sequence including the operation of moving to the position determined by sensing of the camera 700.

For example, in a control device in which the information acquisition by the camera 700 and the movement to a position determined based on the information acquisition result by the camera 700 are set independently, it is necessary to designate the movement to the position determined based on the information acquisition result by the camera 700 after first designating the information acquisition by the camera 700. In the sequence creation work by such a control device, in a state where the information acquisition by the camera 700 is not designated, when the movement to the position determined based on the information acquisition result by the camera 700 is designated and the movement of the robot 100 is actually tested, the control point of the robot 100 moves to an unpredictable position. However, in the embodiment, since the movement to the position determined based on the information acquisition result by the camera 700 is designated in an aspect of being subordinate to the "Vision" C01, it is possible to reduce the possibility of occurrence of such a situation.

Figure 19:
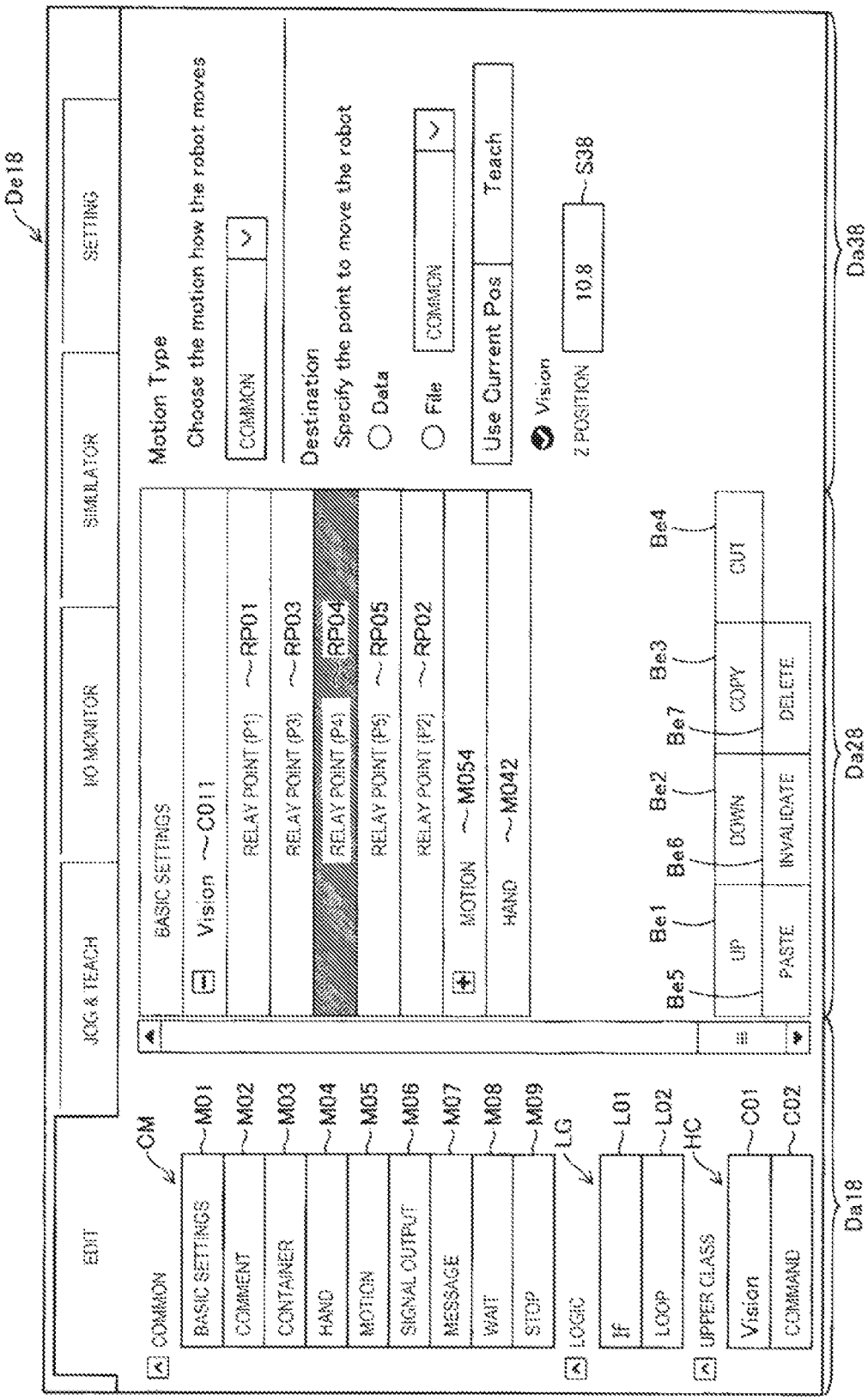
FIG. 19 is a diagram illustrating the display on the display of the setting device in a case where "Relay Point" is selected in the state of FIG. 18.

FIG. 19 is a diagram illustrating the display on the display 602 of the setting device 600 in a case where the "relay Point" RP04 is selected in the state of FIG. 18. On the display 602, a first edit screen De18 is illustrated. The first edit screen De18 includes the first display part Da18, the second display part Da28, and the third display part Da38. When the "Relay Point" RP04 is selected, the screen for property setting of the "Relay Point" RP04 is displayed at the third display part Da38. Since the "Relay Point" RP04 is a relay point set under the "Vision" C011, a check box "Vision" is checked at the third display part Da38.

At the third display part Da38, a position of 10.8 mm in the Z direction is designated as the properties of the "Relay Point" RP04 with respect to a reference position recognized by the camera 700 at an input window S38. According to the aspect, via the first edit screen De1 on which the properties of the operation group can be set, the position to be passed as a teaching point can be specifically set based on the position detected from the images acquired by the camera 700.

In the embodiment, on the first edit screens De16 and De11 in which the properties can be set in the operation group "Vision" C011, the relay point addition button Brp2 capable of further adding a teaching point is displayed (refer to FIGS. 17 to 19). According to the aspect, via the first edit screen De1 on which the properties of the operation group can be set, the position to be passed as a teaching point can be added. Therefore, it is possible to easily create the operation sequence including the operation of moving to the position determined by sensing.

(3) Setting of Relay Point from Teach Screen:

Hereinafter, an example will be described in which a position is previously specified on the position set screen Dt and then a relay point is set for the "Vision" container from the position set screen Dt.

In the state of FIG. 17, when the teaching button Bt is pressed, the display on the display 602 is switched to the position set screen Dt illustrated in FIG. 15. The user operates the buttons Bp01 to Bp06 and Br01 to Br06 on the position set screen Dt, moves the control point of the end effector 200 to the target position, and achieves a target posture of the end effector 200. Thereafter, the user presses a relay point addition button Brp1 on the position set screen Dt.

The relay point addition button Brp1 is a user interface in which a position to be passed as a teaching point can be added. When the relay point addition button Brp1 is pressed, the "Relay Point" RP05 having the point and the posture specified on the position set screen Dt is added as a teaching point, and the screen is in the state of FIG. 18. In this case, at the time of setting the "Relay Point" RP05, the properties, that is, the point and the posture are determined.

In the embodiment, the relay point addition button Brp1 that can further add the position to be passed as a teaching point is included in the position set screen Dt that specifies a specific position with respect to the position to be passed in movement that serves as an operation. According to the aspect, the position to be passed as a teaching point can be added not only from the first edit screen De1 but also from the position set screen Dt. Therefore, compared to the control device in which such a setting from the position set screen Dt is not possible, it is possible to easily create the operation sequence including the operation of moving to a position determined by sensing.

Further, in the embodiment, after specifically setting the position and posture parameters on the position set screen Dt, it is possible to add the position and posture as a position to be passed. Therefore, the user can determine the position to be passed and intuitively add the position as a teaching point.

For example, in an aspect in which the relay point addition button Brp1 is not included in the position set screen Dt, when the user teaches a specific position as a relay point with the position set screen Dt (refer to S130 in FIG. 3), in a case of feeling the necessity of adding a relay point, the user needs to perform the following processing. In other words, the user returns to the first edit screen De1 (refer to FIGS. 17 and 18), and adds a relay point of which a specific position is not specified (refer to S110 in FIG. 3), and again on position set screen Dt, it is necessary to teach a specific position for the added relay point (refer to S130 in FIG. 3). However, when employing various aspects of the embodiment, after specifically setting the parameters on the position set screen Dt, it is possible to add the position to be passed as a teaching point. Therefore, it is possible to efficiently create the operation sequence of the robot 100 by reducing the number of times of traveling between the position set screen Dt and the first edit screen De1.

The display 602 of the setting device 600 of the embodiment is also referred to as "display unit" in the specification. The RAM 330 of the robot control device 300 is also referred to as "first storage" in the specification. The RAM 330 of the robot control device 300 is also referred to as "second storage" in the specification. The GUI information 303g is also referred to as "first information" in the specification. The program generation information 303p is also referred to as "second information" in the specification. The camera 700 is also referred to as "imaging unit" in the specification. The force sensor 190 is also referred to as "force detection unit" in the specification. The relay point addition button Brp1 is also referred to as "first operation unit" in the specification. The relay point addition button Brp2 is also referred to as "second operation unit" in the specification. The robot control device 300 and the setting device 600 are also collectively referred to as "control device". In the robot 100, a part other than the robot control device 300 controlled by the robot control device 300 is also referred to as "robot".

B. Second Embodiment

In the robot system of the second embodiment, an aspect of a display of the second display part Da2 of the first edit screen De1 is different from that of the first embodiment. Further, in the robot system according to the second embodiment, the flowchart of the operation designated at the second display part Da2 can be displayed instead of the third display part Da3. Other points of the robot system of the second embodiment are the same as those of the robot system 1 of the first embodiment.

(1) Display of Operation Icon and Property Icon

Figure 20:
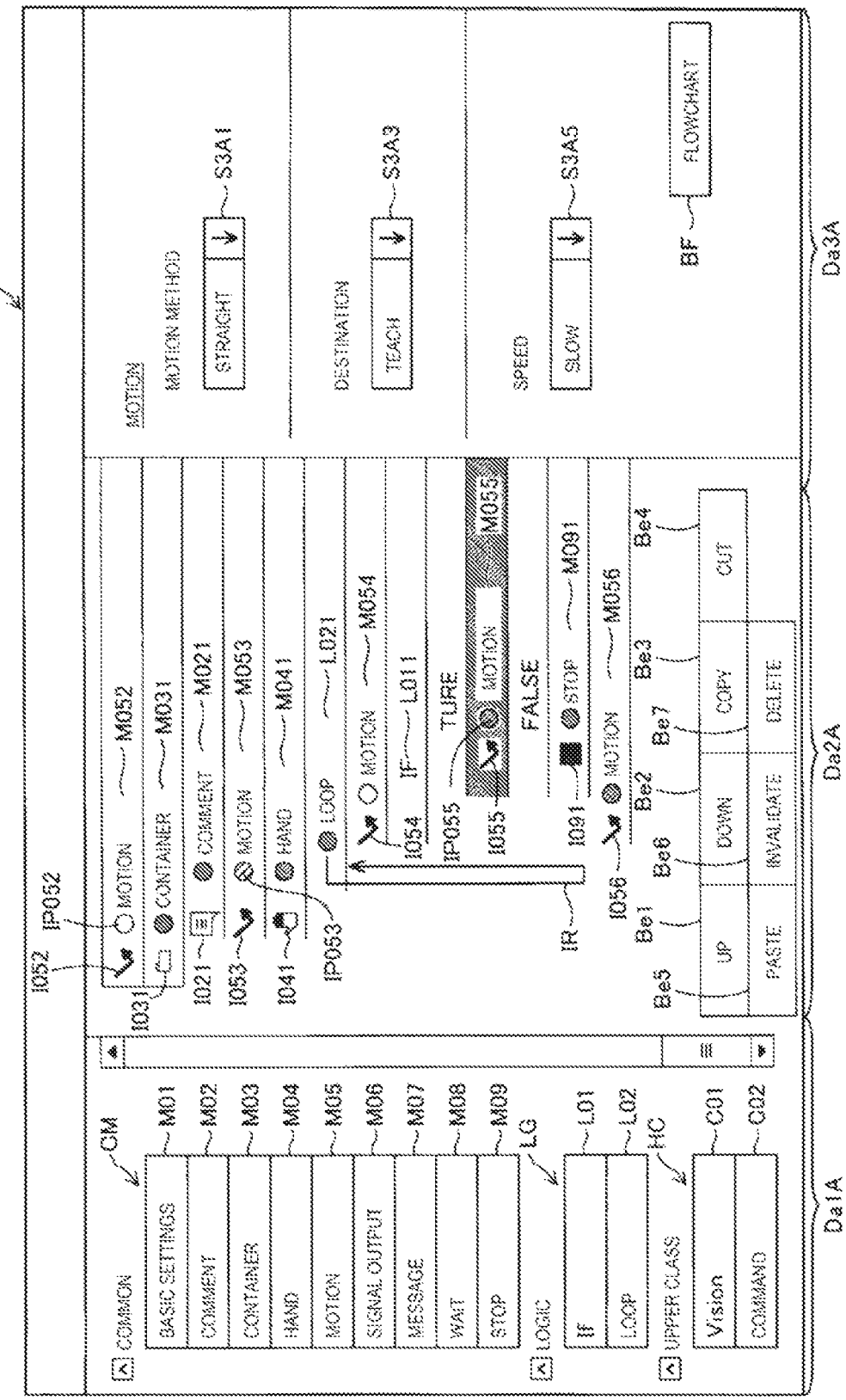
FIG. 20 is a diagram illustrating the display on the display of the setting device in a state after the user selects the operation that configures the operation sequence in step S110 of FIG. 3.

FIG. 20 is a diagram illustrating the display on the display 602 (refer to FIG. 1) of the setting device 600 in a state after the user selects the operation that configures the operation sequence in step S110 of FIG. 3. On the display 602, the first edit screen De1A is illustrated. The first edit screen De1A includes the first display part Da1A, the second display part Da2A, and the third display part Da3A. The first display part Da1A, the second display part Da2A, and the third display part Da3A respectively correspond to the first display part Da12, the second display part Da22, and the third display part Da32 of the first edit screen De12 (refer to FIG. 7).

The first display part Da1A is the same display as the first display part Da11.

At the second display part Da22, the operation sequence is displayed as the arrangement of displays M052, M031, M021, M053, and M041 representing the operation selected via the first display part Da1A. Operations of L021 to M056 are further displayed as operations subordinate to the "Hand" M041.

At the second display part Da22, each operation is represented in a display including icons representing each operation. For different operations, icons of which at least one of shape and color is different are added. In other words, operation icons I052, 1054, 1055, and 1056 of the arrows are displayed on the left side of the "Motion" M052, M054, M055, and M056. On the left side of the "Container" M031, an operation icon 1031 having a shape of a folder is displayed. On the left side of the "Hand" M041, an operation icon 1041 having a shape of a hand is displayed. On the left side of "Stop" M091, an operation icon 1091 having a quadrate shape is displayed.

By performing such processing, the user can intuitively grasp operations to be selected as an edit target or an operation based on the operation icons.

In addition, in the display of each operation, on the right side of the operation icon, property icons representing the set state of the properties are displayed. In FIG. 20, only the property icons IP052, IP053, and IP055 are added by reference numerals in order to make it easy to understand the technology.

The property icon has a circular shape. The property icon representing that the setting of the properties of the operations is appropriately completed is displayed in blue (refer to IP055). The property icon representing that the setting of the properties of the operations has not been completed is displayed in white (refer to IP052). A property icon representing that a value that does not satisfy the constraint condition is set to the property is displayed in red (refer to IP053).

"A case where the constraint condition is not satisfied" is, for example, a case where the properties are set such that the arm 110 of the robot 100 interferes with surrounding structures. In addition, a case where, after the properties of a certain operation is once set, the properties of the container including the operation are set, and as a result, the setting contents of the properties of the container and the setting contents of the properties of the operation group previously do not match each other, is also included in a case where the constraint condition is not satisfied. In other words, the constraint condition may be predetermined or may be determined as a result of another setting.

By performing such processing, the user can intuitively grasp whether or not the setting of the properties of each operation is appropriately completed based on the display color of the icon. In addition, the user can be urged to reset the properties for the operation in which the red property icon is displayed.

Furthermore, at the second display part Da22, an arrow IR representing repetition is displayed on the left side of the processing that is subordinate to the "Loop" L021 and repeated until the condition is satisfied. By performing such a display, the user can easily understand which processing belongs to the repeating loop.

The second display part Da2 of the second embodiment is the same as the second display part Da2 of the first embodiment except that the different operation icons are displayed for each type of operation, that the property icon is displayed, and that the loop of processing is visually displayed.

At the third display part Da3A, the properties of the selected operations among the operations included in the operation sequence displayed at the second display part Da2A are displayed. Values of the properties are set via the third display part Da3A (refer to S120 of FIG. 3). In a state of FIG. 20, since the display M055 of "Motion" is selected, at the third display part Da3A, a screen for setting the properties of "Motion" is displayed.

At the third display part Da3A, it is possible to set "Straight", "Linear (PtoP)", or "Jump" with respect to the method of designating the movement as the properties of "Motion" via a display S31. In a case where the "Straight" is selected, the control point moves along straightly. In a case where the "Linear" is selected, only the departure point and the destination point are designated as the control point, and a movement path therebetween is not designated. In a case where the "Jump" is selected, the control point moves from the departure point to the destination point while avoiding a region between the departure point and the destination point.

In addition, at the third display part Da3A, for the setting method of the destination point of the operation, the "Teach" or "Vision" can be set as the properties of "Motion" via a display S33. For the operation speed, the "Low Speed", the "Normal", or the "High Speed" can be set as the properties of "Motion" via a display S35.

The third display part Da3A includes a flowchart display button BF. In a case where the flowchart display button BF is pressed at the third display part Da3A, a flowchart including the operation designated at this time is displayed instead of the third display part Da3A. Other points of the third display part Da3A are the same as those of the third display part Da3 of the first embodiment.

Figure 21:
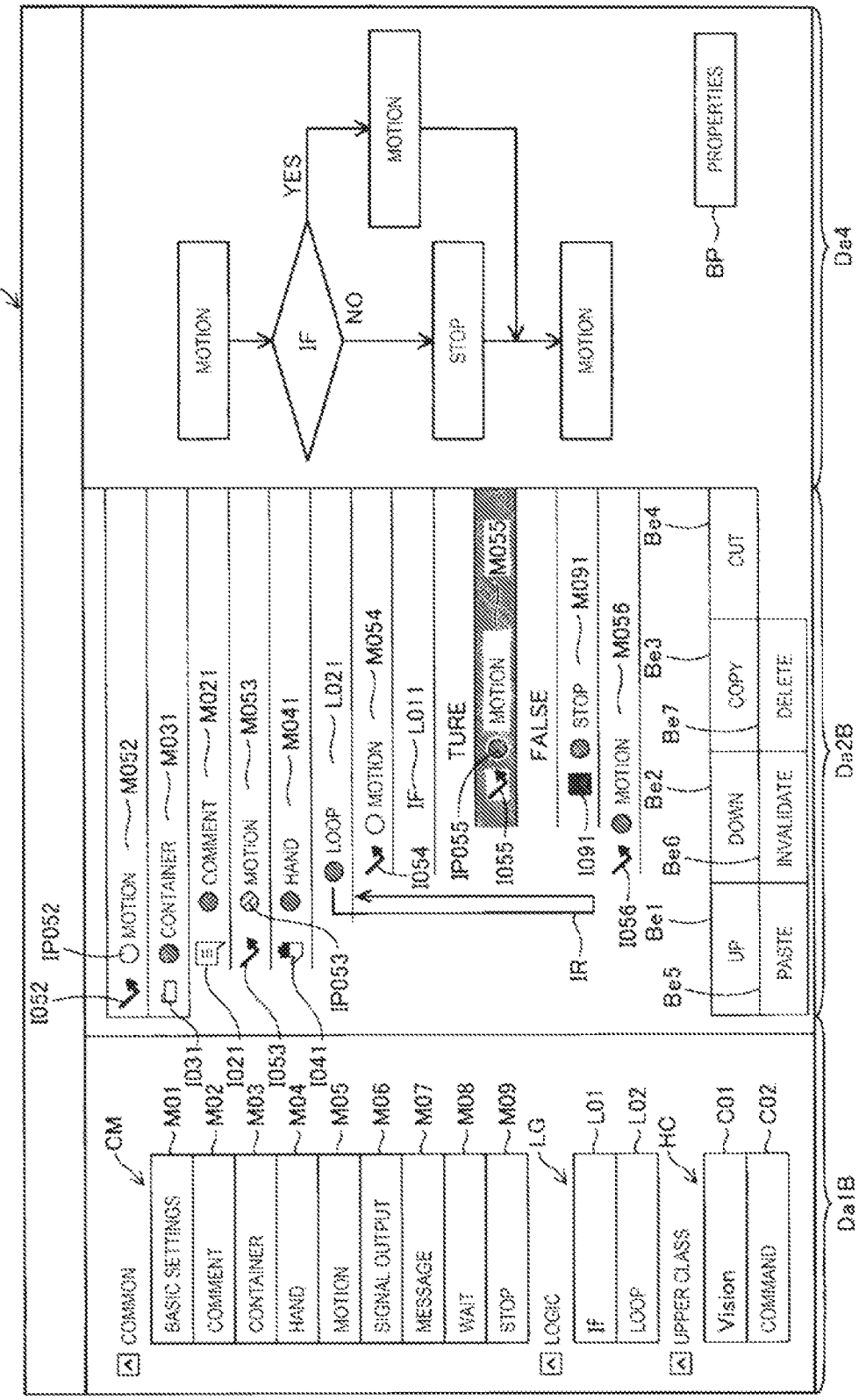
FIG. 21 is a diagram illustrating the display on the display illustrated in a case where a flowchart display button is pressed on a first edit screen illustrated in FIG. 20.

FIG. 21 is a diagram illustrating the display on the display 602 illustrated in a case where the flowchart display button BF is pressed on the first edit screen De1A illustrated in FIG. 20. On the display 602, the first edit screen De1B is illustrated. The first edit screen De1B includes the first display part Da1B, the second display part Da2B, and a fourth display part Da4. The first display part Da1B is the same display as the first display part Da1A. The second display part Da2B is the same display as the second display part Da2A. The fourth display part Da4 is displayed instead of the third display part Da3A.

At the fourth display part Da4, when the flowchart display button BF is pressed, a flowchart of a part of the sequence including the "Motion" M055 designated at the second display part Da2B (refer to FIG. 20) is displayed. More specifically, a part of the sequence including (i) "Motion" M055, (ii) processing immediately before the branch that reaches the "Motion" M055, (iii) initial processing after a point where the processing after the "Motion" M055 is joined, and (iv) operations therebetween, is displayed as a flowchart.

In the embodiment, the fourth display part Da4 including a flowchart illustrating a part of the operation sequence displayed at the second display part Da2 is displayed instead of the third display part Da3A. By performing such processing, the user can edit the operation sequence of the second display part Da2B while confirming the flowchart of the fourth display part Da4.

C. Third Embodiment

FIG. 22 is a conceptual diagram illustrating an example in which the control device of the robot is configured with a plurality of processors. The example is different from FIG. 1 in that the robot control device 300 of the robot 100 is provided on the outside of the robot 100. Further, in the example, in addition to the robot 100 and the robot control device 300, personal computers 600 and 600d that serve as setting devices and a cloud service 1000 provided via a network environment, such as LAN, are drawn. The personal computers 600 and 600d respectively include a processor and a memory. In addition, in the cloud service 1000, the processor and the memory can also be used. The processor executes computer-executable commands. It is possible to realize the robot control device and the setting device of the robot 100 by using a part or all of the plurality of processors.

D. Other Aspects

D1. Another Aspect 1:

(1) In the above-described embodiments, in a case where the "Command" button C02 in the lower left is pressed on the first edit screen De1 (refer to FIGS. 6 to 9), the second edit screen De2 is displayed instead of the second display part Da2 on the first edit screen De1. However, the second edit screen De2 can also be displayed instead of the entire first edit screen De1. In such a case, it is preferable to provide a user interface, such as a button for switching to the first edit screen De1 on the second edit screen De2.

(2) In the above-described embodiments, both the GUI information 303g and the program generation information 303p (refer to FIG. 5) are stored in the RAM 330 (refer to FIG. 1) of the robot control device 300. However, the GUI information 303g and the program generation information 303p may be respectively stored in different storages which are different hardware.

(3) In the above-described embodiments, the creation of the program file (refer to S140 of FIG. 3) is performed after creation of a sequence (refer to S110 of FIG. 3), setting of properties (refer to S120 of FIG. 3), and jogging and teaching (refer to S130 in FIG. 3). However, it is also possible to employ an aspect in which the creation of the program file is performed, for example, when creating (refer to S110 in FIG. 3) a sequence via the first edit screen De1 and setting (refer to S120 in FIG. 3) the properties. In the aspect, for example, the program file may be created as the user presses a predetermined button within the first edit screen De1. In addition, it is also possible to employ an aspect in which the creation of the program file is automatically performed every time the contents are changed in creation of a sequence (refer to S110 in FIG. 3) and the setting of the properties (refer to S120 in FIG. 3) via the first edit screen De1.

(4) The setting device 600 may have the following functions in addition to the function (refer to S140 of FIG. 3 and FIGS. 13 and 14) in which the operation sequence set via the first edit screen De1 is converted into the operation sequence CLM expressed in the programming language. In other words, the setting device 600 may have a function of converting the operation sequence CLM expressed in the programming language via the second edit screen De2 into the image of the operation sequence to be displayed on the first edit screen De1. In the aspect, it is possible to employ an aspect in which setting contents that cannot be set via the first edit screen De1 are replaced with setting contents that can be set via the first edit screen De1.

(5) In the above-described embodiment, the value of the parameter that determines the control point of the robot 100 is determined by the jogging and teaching (refer to S130 in FIG. 3 and FIG. 15). However, it is also possible for the user to directly move the arm 110 of the robot 100, and to determine the value of the parameter that determines the control point of the robot 100. In addition, by machine learning and simulation, it is also possible to determine the value of the parameter that determines the control point of the robot 100.

D2. Another Aspect 2:

In the above-described embodiments, the first display part Da1 includes the "Container" M03 and it is possible to arrange and edit not only methods (operations) but also containers including one or more operations at the second display part Da2 (refer to FIGS. 6 to 9, and FIGS. 17 to 21). However, it is also possible to employ an aspect in which the first display part Da1 does not include the "Container" M03 and the containers cannot be arranged and edited at the second display part Da2.

D3. Another Aspect 3:

In the above-described embodiments, the properties of the operation can be set via the third display part Da3 of the first edit screen De1 (FIGS. 7 to 9, 19, and 20). However, it is also possible to employ an aspect in which the properties cannot be set on the first edit screen De1 and the properties can be set through the second edit screen De2.

D4. Another Aspect 4:

(1) In the above-described embodiments, when the settings of the properties of the container are specifically determined, the properties of the primitive method included in the container are automatically determined, or the setting range that cannot be set with respect to the properties of the primitive method included in the container is generated. However, it is also possible to employ an aspect in which, even in a case where the setting of the properties of the container is specifically determined, the properties of the primitive method included in the container is not automatically determined.

In the aspect, in a case where the setting contents of the properties of the container and the setting contents of the properties of the operation belonging to the container do not match each other, it is preferable that, in the operation, a property icon representing that the properties are not set and the property icon different from the property icon representing that the properties are appropriately set are displayed (refer to IP053 in FIGS. 20 and 21).

(2) In the above-described embodiments, the icon representing the operation and the property icon representing the setting state of the properties of the operation are separate icons (refer to I052 and IP052 in FIG. 20). However, it is also possible to employ an aspect in which one icon represents a certain operation and also represents the setting state of the properties of the operation.

D5. Another Aspect 5:

(i) The GUI information 303g that serves as the first information in which the operation and the image representing the operation on the first edit screen De1 are correlated with each other, and (ii) the program generation information 303p (refer to FIG. 5) that serves as the second information in which the operation and the expression in the programming language representing the operation on the second edit screen De2 are correlated with each other, may be stored in the same data file or may be stored as separate data files in the storage. However, when an aspect in which the first information and the second information are stored as separate files is employed, it is possible to prepare the data file of the first information for each specification of the display unit, if necessary. In addition, it is possible to prepare the data file of the second information for each specification of the control target, if necessary. Accordingly, compared to an aspect in which the first information and the second information are not distinguished and stored in the same data file, it is easy to manage the information.

E. Still Another Aspect

Application Example 1

A control device for controlling a robot is provided. The control device includes: a display control unit that is capable of displaying a first edit screen on which an operation sequence of the robot can be edited by selecting images representing one or more operations among images representing a plurality of operations and arranging the images on a screen, and a second edit screen on which the operation sequence expressed in a programming language, which is obtained by converting the operation sequence edited via the first edit screen is displayed and the operation sequence expressed in the programming language can be edited, on a display unit; and an operation control unit that controls the robot based on the operation sequence edited via at least one of the first edit screen and the second edit screen.

According to the aspect, the user who does not have an advanced programming skill can edit the operation sequence of the robot using the first edit screen. Meanwhile, the user who has an advanced programming skill can edit the operation sequence of the robot while designating processing contents of the robot in detail using the second edit screen.

Application Example 2

In the control device according to Application Example 1, the display control unit is capable of further displaying the first edit screen on which the operation sequence of the robot can be edited by selecting an operation group including one or more operations and arranging the operation group on the screen, on the display unit.

According to the aspect, the user can edit the operation sequence of the robot, for example, by selecting pre-prepared operation group in the control device and arranging the operation group on the screen. In addition, by selecting the operation group of which at least a part of one or more operations included in the operation group is edited by itself or by the user in advance and arranging the operation group on the screen, it is possible to edit the operation sequence of the robot. Accordingly, on the first edit screen, compared to an aspect in which it is necessary to select and arrange the operations one by one, the user can easily edit the operation sequence of the robot.

Application Example 3

In the control device according to Application Example 2, the display control unit is capable of displaying the first edit screen on which properties of the operations can be set and properties of the operation group can be set, on the display unit as the first edit screen, and automatically sets the properties of the operations included in the operation group in accordance with the properties set for the operation group.

According to the aspect, compared to an aspect in which it is necessary to set the properties of each operation on the first edit screen, the user can easily set the properties of one or more operations included in the operation group.

Application Example 4

In the control device according to Application Example 1 or 2, the display control unit is capable of displaying the first edit screen on which the properties of the operation can be set, on the display unit, and the control device further includes a file creation unit that creates a program file including information on the operation sequence edited via the first edit screen and the properties set via the first edit screen.

In a case where the program file contains only the information of the operation sequence and does not contain the information on the properties, in order to operate the robot using the program file, it is necessary to additionally write the information on the properties into the program file. However, according to the aspect, since the program file including not only the operation sequence but also the information on the properties is created, it is possible to operate the robot using the created program file.

Application Example 5

In the control device according to Application Example 4, the display control unit displays the first edit screen including the image on the display unit by referring to first information which is stored in a first storage and in which the operation and the image representing the operation on the first edit screen are correlated with each other, the file creation unit converts the operation sequence edited via the first edit screen and creates the program file by referring to second information which is stored in a second storage and in which the operation and an expression in the programming language representing the operation on the second edit screen are correlated with each other, and the display control unit displays the second edit screen including the expression in the programming language representing the operation on the display unit based on the program file.

According to the aspect, by displaying the first edit screen including the image representing the operation on the display unit, it is possible to present the user with the first edit screen which is intuitively easy to understand. In addition, by displaying the second edit screen including the expression in the programming language representing the operation on the display unit, it is possible to present the user with the second edit screen of which the detailed operation contents are intuitively easy to understand.

Application Example 6

The technology disclosed in the specification can be an aspect of a robot controlled by the control device according to any one of Application Examples 1 to 5.

Application Example 7

The technology disclosed in the specification can also be an aspect of a robot system including the control device according to any one of Application Examples 1 to 5, and a robot controlled by the control device.

All of the plurality of configuration elements included in each of the aspects of the above-described invention are not indispensable, and in order to solve a part or all of the above-described problems, or to achieve a part or all of the effects described in the specification, it is possible to change, delete, and replace a part of the configuration element among the plurality of configuration elements, with other new configuration elements, and to delete a part of the restricted contents, in an appropriate manner. In addition, in order to solve a part or all of the above-described problems, or in order to achieve a part or all of the effects described in the specification, by combining a part or all of the technical features included in one aspect of the above-described invention with a part or all of the technical features included in another aspect of the above-described invention, it is also possible to make one independent aspect of the invention.

The entire disclosure of Japanese Patent Application No. 2018-066410, filed Mar. 30, 2018 is expressly incorporated by reference herein.

What is claimed is:
1. A control device for controlling a robot, comprising:
a processor that is configured to execute computer-executable instructions so as to control a robot, wherein the processor is configured to:
display a first edit screen on which an operation sequence of the robot can be edited by selecting images representing one or more operations among images representing a plurality of operations and arranging the images on a screen, and a second edit screen on which the operation sequence expressed in a programming language, which is obtained by converting the operation sequence edited via the first edit screen is displayed and the operation sequence expressed in the programming language can be edited, on a display; and
control the robot based on the operation sequence edited via at least one of the first edit screen and the second edit screen,
wherein, the operation sequence is displayed as the arrangement of operations selected via the first edit screen, and the order of the operation sequence being edited by editing the arrangement of the operations, and
on a display part of the first edit screen which displays the operation sequence that serves as the edit target, an operation is selected and incorporated into the operation sequence that serves as the edit target at another display part of the first edit screen,
the second edit screen is displayed instead of the display part of the first edit screen, in a case where a button of the another display part is pressed, and on the second edit screen, from all of the setting ranges that can be set for each of the properties by the setting device without limitation set at the first edit screen, the properties of the operation sequence can be set.

2. The control device according to claim 1,
wherein the processor is configured to display the first edit screen on which the operation sequence of the robot can be edited by selecting an operation group including one or more operations and arranging the operation group on the screen, on the display.

3. The control device according to claim 2,
wherein the processor is configured to:
display the first edit screen on which properties of the operations can be set and properties of the operation group can be set, on the display as the first edit screen, and
automatically set the properties of the operations included in the operation group in accordance with the properties set for the operation group.

4. The control device according to claim 1,
wherein the processor is configured to:
display the first edit screen on which the properties of the operation can be set, on the display, and
create a program file including information on the operation sequence edited via the first edit screen and the properties set via the first edit screen.

5. The control device according to claim 2,
wherein the processor is configured to:
display the first edit screen on which the properties of the operation can be set, on the display, and
create a program file including information on the operation sequence edited via the first edit screen and the properties set via the first edit screen.

6. The control device according to claim 4,
wherein the processor is configured to:
display the first edit screen including the image on the display by referring to first information which is stored in a first storage and in which the operation and the image representing the operation on the first edit screen are correlated with each other,
convert the operation sequence edited via the first edit screen into the program file by referring to second information which is stored in a second storage and in which the operation and an expression in the programming language representing the operation on the second edit screen are correlated with each other, and
display the second edit screen including the expression in the programming language representing the operation on the display based on the program file.

7. The control device according to claim 5,
wherein the processor is configured to:
display the first edit screen including the image on the display by referring to first information which is stored in a first storage and in which the operation and the image representing the operation on the first edit screen are correlated with each other,
convert the operation sequence edited via the first edit screen into the program file by referring to second information which is stored in a second storage and in which the operation and an expression in the programming language representing the operation on the second edit screen are correlated with each other,
and display the second edit screen including the expression in the programming language representing the operation on the display based on the program file.

8. A robot comprising:
a processor that is configured to execute computer-executable instructions so as to control the robot,
wherein the processor is configured to:
display a first edit screen on which an operation sequence of the robot can be edited by selecting images representing one or more operations among images representing a plurality of operations and arranging the images on a screen, and a second edit screen on which the operation sequence expressed in a programming language, which is obtained by converting the operation sequence edited via the first edit screen is displayed and the operation sequence expressed in the programming language can be edited, on a display; and
control the robot based on the operation sequence edited via at least one of the first edit screen and the second edit screen,
wherein, the operation sequence is displayed as the arrangement of operations selected via the first display, and the order of the operation sequence being edited by editing the arrangement of the operations, and
on a display part of the first edit screen which displays the operation sequence that serves as the edit target, an operation is selected and incorporated into the operation sequence that serves as the edit target at another display part of the first edit screen,
the second edit screen is displayed instead of the display part of the first edit screen, in a case where a button of the another display part is pressed, and on the second edit screen, from all of the setting ranges that can be set for each of the properties by the setting device without limitation set at the first edit screen, the properties of the operation sequence can be set.

9. The robot according to claim 8,
wherein the processor is configured to display the first edit screen on which the operation sequence of the robot can be edited by selecting an operation group including one or more operations and arranging the operation group on the screen, on the display.

10. The robot according to claim 9,
wherein the processor is configured to:
display the first edit screen on which properties of the operations can be set and properties of the operation group can be set, on the display as the first edit screen, and
automatically set the properties of the operations included in the operation group in accordance with the properties set for the operation group.

11. The robot according to claim 8,
wherein the processor is configured to:
display the first edit screen on which the properties of the operation can be set, on the display, and
create a program file including information on the operation sequence edited via the first edit screen and the properties set via the first edit screen.

12. The robot according to claim 9,
wherein the processor is configured to:
display the first edit screen on which the properties of the operation can be set, on the display, and
create a program file including information on the operation sequence edited via the first edit screen and the properties set via the first edit screen.

13. The robot according to claim 11,
wherein the processor is configured to:
display the first edit screen including the image on the display by referring to first information which is stored in a first storage and in which the operation and the image representing the operation on the first edit screen are correlated with each other,
convert the operation sequence edited via the first edit screen into the program file by referring to second information which is stored in a second storage and in which the operation and an expression in the programming language representing the operation on the second edit screen are correlated with each other, and display the second edit screen including the expression in the programming language representing the operation on the display based on the program file.

14. A robot system comprising:

a robot; and a control device that comprises a processor that is configured to execute computer-executable instructions so as to control the robot;

wherein the processor is configured to:

display a first edit screen on which an operation sequence of the robot can be edited by selecting images representing one or more operations among images representing a plurality of operations and arranging the images on a screen, and a second edit screen on which the operation sequence expressed in a programming language, which is obtained by converting the operation sequence edited via the first edit screen is displayed and the operation sequence expressed in the programming language can be edited, on a display; and control the robot based on the operation sequence edited via at least one of the first edit screen and the second edit screen, wherein, the operation sequence is displayed as the arrangement of operations selected via the first edit screen, and the order of the operation sequence being edited by editing the arrangement of the operations, and on a display part of the first edit screen which displays the operation sequence that serves as the edit target, an operation is selected and incorporated into the operation sequence that serves as the edit target at another display part of the first edit screen, the second edit screen is displayed instead of the display part of the first edit screen, in a case where a button of the another display part is pressed, and on the second edit screen, from all of the setting ranges that can be set for each of the properties by the setting device without limitation set at the first edit screen, the properties of the operation sequence can be set.

15. The robot system according to claim 14, wherein the processor is configured to display the first edit screen on which the operation sequence of the robot can be edited by selecting an operation group including one or more operations and arranging the operation group on the screen, on the display.

16. The robot system according to claim 15, wherein the processor is configured to:

display the first edit screen on which properties of the operations can be set and properties of the operation group can be set, on the display as the first edit screen, and automatically set the properties of the operations included in the operation group in accordance with the properties set for the operation group.

17. The robot system according to claim 14, wherein the processor is configured to:

display the first edit screen on which the properties of the operation can be set, on the display, and create a program file including information on the operation sequence edited via the first edit screen and the properties set via the first edit screen.

18. The robot system according to claim 15, wherein the processor is configured to:

display the first edit screen on which the properties of the operation can be set, on the display, and create a program file including information on the operation sequence edited via the first edit screen and the properties set via the first edit screen.

19. The robot system according to claim 17, wherein the processor is configured to:

display the first edit screen including the image on the display by referring to first information which is stored in a first storage and in which the operation and the image representing the operation on the first edit screen are correlated with each other, convert the operation sequence edited via the first edit screen into the program file by referring to second information which is stored in a second storage and in which the operation and an expression in the programming language representing the operation on the second edit screen are correlated with each other, and display the second edit screen including the expression in the programming language representing the operation on the display based on the program file.

20. The robot system according to claim 18, wherein the processor is configured to:

display the first edit screen including the image on the display by referring to first information which is stored in a first storage and in which the operation and the image representing the operation on the first edit screen are correlated with each other, convert the operation sequence edited via the first edit screen into the program file by referring to second information which is stored in a second storage and in which the operation and an expression in the programming language representing the operation on the second edit screen are correlated with each other, and display the second edit screen including the expression in the programming language representing the operation on the display based on the program file.

* * * * *